United States Patent [19]

Weaver et al.

[11] Patent Number: 4,459,229

[45] Date of Patent: Jul. 10, 1984

[54] HETEROCYCLIC AZO DYES WITH COUPLERS HAVING SULFOARALKYL GROUPS

[75] Inventors: Max A. Weaver; Clarence A. Coates, Jr., both of Kingsport, Tenn.

[73] Assignee: Eastman Kodak Company, Rochester, N.Y.

[21] Appl. No.: 501,223

[22] Filed: Jun. 6, 1983

Related U.S. Application Data

[63] Continuation-in-part of Ser. No. 310,153, Oct. 9, 1981, abandoned.

[51] Int. Cl.$^3$ .................... C09B 29/033; C09B 29/09; C09B 29/36; C09B 29/44
[52] U.S. Cl. .................................... 260/152; 260/155; 260/156; 260/157; 260/158; 260/162; 260/163
[58] Field of Search ............... 260/152, 157, 158, 155, 260/156, 162, 163

[56] References Cited

U.S. PATENT DOCUMENTS

| | | | |
|---|---|---|---|
| 3,639,384 | 2/1972 | Weaver et al. | 260/152 |
| 4,041,025 | 8/1977 | Wolfrum et al. | 260/158 |
| 4,063,881 | 12/1977 | Razavi | 260/158 |
| 4,264,495 | 4/1981 | Maher et al. | 260/152 |

FOREIGN PATENT DOCUMENTS 2005294 4/1979 United Kingdom ............ 260/207.1

*Primary Examiner*—Floyd D. Higel
*Attorney, Agent, or Firm*—Donald W. Spurrell; Daniel B. Reece, III

[57] ABSTRACT

This invention relates to azo dyes prepared by diazotizing substituted or unsubstituted heterocyclic amines such as 2-aminothiophene and coupling with certain aniline, tetrahydroquinoline, or benzomorpholine compounds containing sulfoaralkyl groups. These dyes are particularly useful in dyeing polyamide fibers, cellulose acetate fibers and wool.

10 Claims, No Drawings

HETEROCYCLIC AZO DYES WITH COUPLERS HAVING SULFOARALKYL GROUPS

This application is a continuation-in-part of Ser. No. 310,153 filed Oct. 9, 1981, and now abandoned.

This invention concerns novel dyes which comprise heterocyclic diazo moieties and aromatic amine couplers having sulfoaralkyl groups. These dyes are substantially water soluble and are particularly useful for dyeing polyamide, wool and the like and generally exhibit excellent properties including fastness to light and dyeability.

The dyes of this invention correspond to the following general formula:

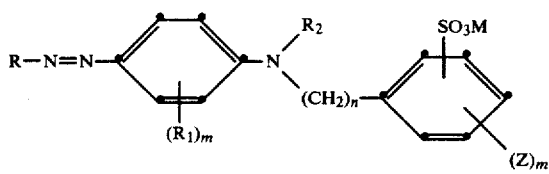

wherein R is a heterocyclic radical selected from benzothiazol-2-yl, 2,1-benzisothiazol-3-yl, 1,3,4-thiadiazol-2-yl, 1,2,4-thiadiazol-5-yl, isothiazol-5-yl, pyrazol-5-yl, thiophen-2-yl, and thiazol-2-yl, each of which radicals may be substituted as further defined below; each $R_1$ and Z are selected independently from alkyl, alkoxy, alkenyl of 2–6 carbons, halogen, acylamido, and alkylthio; $R_2$ is selected from hydrogen, alkyl, alkenyl of 2–6 carbons, aryl, cycloalkyl, and

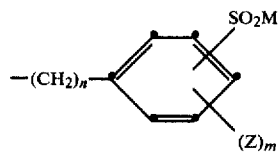

and $R_2$ in conjunction with $R_1$ may form a 1,2,3,4-tetrahydroquinoline or a 2,3-dihydro-1,4-benzoxazine (benzomorpholine) ring as defined in more detail below; M is $H^+$, $Na^+$, $K^+$, or $NH_4$; n is 1–6; and m is 0, 1 or 2.

More particularly the dyes correspond to the formula above wherein R is selected from

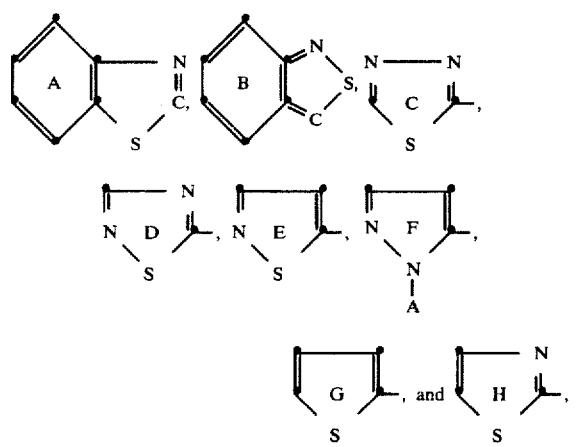

wherein

Ring A may have 1–3 substituents selected from alkyl, alkoxy, thiocyano, alkylthio, cyano, carbamoyl, alkylcarbamoyl, alkoxycarbonyl, acyl, alkylsulfonyl, sulfamoyl, $SO_2NH(alkyl)$, $SO_2N(dialkyl)$, alkylsulfonamido, acylamido, halogen, trifluoromethyl, and $SO_3(aryl)$;

Ring B may have 1–3 substituents selected from alkyl, alkoxy, chlorine, bromine, $SO_2NH_2$, $SO_2NH(alkyl)$, and $SO_2N(dialkyl)$;

Ring C may have a substituent selected from alkyl, alkoxy, halogen, alkylsulfonyl, $SO_2NH_2$, $SO_2NH(alkyl)$, $SO_2N(dialkyl)$, arylsulfonyl, acylamido, aryl, arylthio, alkenylthio, cyclohexylthio, thiocyano, cyclohexylsulfonyl, alkylthio, and cyclohexyl;

Ring D may have a substituent selected from alkyl, aryl, halogen, alkylthio, cyclohexylthio, and alkylsulfonyl;

Ring E may have 1 or 2 substituents selected from alkyl, halogen, cyano, carbamoyl, CONH alkyl, alkoxycarbonyl, alkylthio, alkenylthio, arylthio cyclohexylthio, S-heterocycle, aryloxy, and alkoxy;

Ring F may have 1 or 2 substituents selected from alkyl, alkoxycarbonyl, alkylthio, aryl, cyano, carbamoyl, alkylcarbamoyl, and alkylsulfonyl, and the hydrogen on the 1-position nitrogen may be replaced with alkyl, aryl of 6–10 carbons, alkylsulfonyl, arylsulfonyl, alkanoyl, or alkoxycarbonyl;

Ring G may be substituted with 1–3 groups selected from alkyl, cyano, alkoxycarbonyl, acyl, alkylsulfonyl, arylsulfonyl, carbamoyl, alkylcarbamoyl, aryl, aroyl, halogen, sulfamoyl, hydroxyalkylcarbamoyl, alkylsulfamoyl, and formyl;

Ring H may have one or two substituents selected from alkyl, aryl, alkoxycarbonyl, carbonyl, CONH(alkyl), $CON(alkyl)_2$, halogen, cyano, thiocyano, alkylthio, alkylsulfonyl, arylsulfonyl, formyl, acyl, and aroyl;

and substituent A is selected from H, phenyl, phenylsulfonyl, alkanoyl, alkoxycarbonyl, alkyl, halophenyl, alkylphenyl, alkylsulfonyl, hydroxyalkyl, alkylphenylsulfonyl and cyclohexylsulfonyl.

The couplers are described more particularly by the following formulae:

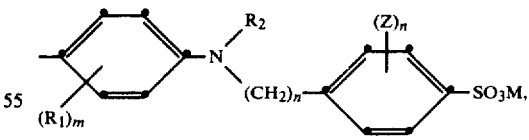

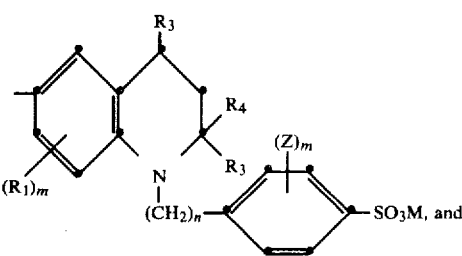

-continued

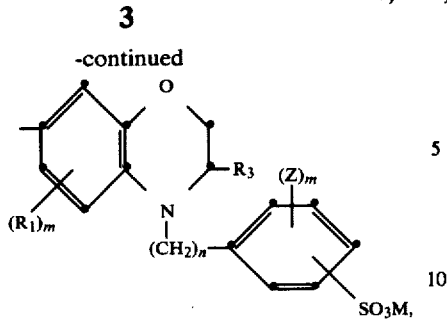

wherein $R_1$, Z, M, m and n are as defined above, and $R_3$ and $R_4$ are each selected from hydrogen and alkyl.

All of the above defined alkyl, alkoxy, alkylene, alkenyl and cyclic moieties in the definitions of $R_1$, $R_2$ and Z, and the thiophene ring substituents may bear up to three substituents selected from hydroxy, alkoxy, aryl, aryloxy, cyclohexyl, furyl, alkylcyclohexyl, aroyloxy, alkoxycarbonyl, alkanoyloxy, sulfamoyl, $SO_2NH(aryl)$, $SO_2NH(alkyl)$, $SO_2N(dialkyl)$, NHCOO(alkyl), NHCONH(alkyl), acylamido, alkylsulfonamido, succinimido, glutarimido, phthalimido, 2-pyrrolidono, cyano, carbamoyl, alkylcarbamoyl, alkoxyalkoxy, alkylthio, halogen, arylthio, alkylsulfonyl and arylsulfonyl.

The various alkyl, alkylene, alkoxy, alkanoyl and the like moieties within the above definitions of R, $R_1$, $R_2$ and Z are of 1-6 carbons, and they and the alkenyl groups may be straight or branched chain.

The dyes of this invention impart red to blue shades on fibers, particularly polyamides, and are especially useful for dyeing polyamide (nylon) carpets, exhibiting improvements in one or more properties such as fastness to light, ozone, oxides of nitrogen, pesticides, insecticides such as organophosphorous compounds (e.g. Malathion ®), washing, sublimation and crocking and leveling, transfer, exhaustion and build.

The heterocyclic amines used in this invention are prepared according to procedures well known to the art. The couplers may be sulfonated prior to or after coupling, and the dye may be isolated when M is $H^+$, but usually is isolated as the sodium or potassium salt. The following examples wherein moles are designated "m" will further illustrate the preparations.

EXAMPLE 1

Preparation of α-(N-Ethylanilino)-Toluenesulfonic Acid

To 30.0 g. of 100% sulfuric acid is added N-benzyl-N-ethylaniline (30.0 g) dropwise below about 50° C. To this solution is added, at 50°-60° C., 60% oleum (30.0 g.) with good stirring. The mixture is stirred and heated at about 60° C. for three hours and then drowned into 200 ml of water. The free sulfonic acid which is mostly the meta isomer with a small amount of para, precipitates on standing and is collected by filtration, washed with water, and dried. N-Benzylanilines containing groups such as alkyl, alkoxy, and halogen in the ortho, meta, or para positions of the benzyl group may be sulfonated by this procedure. The exact location of the sulfonic acid group in these cases is often not known and mixtures usually are produced.

Aromatic amines which contain N-aralkyl groups and which can be sulfonated by the above procedure include:

| EXAMPLE NO. | |
|---|---|
| 2 | N—Benzyl-N—ethyl-m-toluidine |
| 3 | N—Benzyl-2,7-dimethyl-1,2,3,4-tetrahydroquinoline |
| 4 | N—Benzyl-2,3-dihydro-3,6-dimethyl-1,4-benzoxazine |
| 5 | N—Methyl-N—(2-phenylethyl)aniline |
| 6 | N—Ethyl-N—(4-phenylbutyl)-3-chloroaniline |
| 7 | N,N—Dibenzylaniline |
| 8 | N—Benzyl-2,5-dimethylaniline |
| 9 | N—Benzyl-2-methoxy-5-methylaniline |
| 10 | N—Benzyl-2-methoxy-5-chloroaniline |
| 11 | N—Benzyl-N—cyclohexylaniline |

EXAMPLES 12-21

Diazotization and Coupling of 2-Amino-6-methylbenzothiazole

To 150 g. of 60% acetic acid containing 10 g. of concentrated $H_2SO_4$ is added 8.2 g. (0.05 m) of 2-amino-6-methylbenzothiazole at room temperature. The solution is cooled to −5° C., and a solution of 3.6 g. $NaNO_2$ in 20 ml of concentrated $H_2SO_4$ is added below 0° C. The reaction mixture is stirred at −5° to 0° C. for 1.5 hours. Each of the couplers (0.005 m) listed below as Examples 1-10 is added to water, or a 0.005 mole aliquot of the coupler in dilute sulfuric acid is added to water, and cooled in an ice bath.

To each chilled coupler is added a 0.005 mole aliquot of the diazonium solution. The coupling mixture is treated with enough potassium acetate to neutralize the mineral acid. Water is added to the coupling mixture to a total volume of about 200 ml and the dyes collected by filtration, washed with 10% KCl solution, and dried in air. The dyes usually are admixed with about an equal weight of $K_2SO_4$ and are used for dyeing without further purification to produce red shades on polyamides.

EXAMPLES 22-31

Diazotization and Coupling of 3-Amino-2,1-benzisothiazole

To 25 ml of concentrated $H_2SO_4$ is added 3.6 g. of $NaNO_2$ portionwise below 80° C. The solution is cooled and 50 ml of 1:5 acid (1 part propionic, 5 parts acetic acid) is added below 20° C. The mixture is further cooled and 3-amino-2,1-benzisothiazole (7.5 g., 0.05 m) is added, followed by 50 ml of 1:5 acid, all at 0°-5° C. The diazonium, after stirring at 0°-5° C. for 1 hr., is coupled to each of the couplers of Examples 1-10 in a similar manner as above to produce violet to reddish blue dyes for polyamides.

EXAMPLES 32-41

Diazotization and Coupling of 2-Amino-5-ethylthio-1,3,4-thiadiazole

Sodium nitrite (3.6 g.) is added portionwise to 25 ml of concentrated $H_2SO_4$. The solution is cooled and 100 ml of 1:5 acid is added below 15° C. The mixture is cooled and 8.05 g. (0.05 m) of 2-amino-5-ethylthio-1,3,4-thiadiazole is added below 10° C. After stirring at 0°-5° C. for two hrs., a 0.005 m aliquot of the diazonium salt is coupled to 0.005 m of each of the couplers of Examples 1-10 to produce red dyes for polyamides.

EXAMPLES 42–51

Diazotization of 5-Amino-3-ethylthio-1,2,4-thiadiazole

5-Amino-3-ethylthio-1,2,4-thiadiazole (8.05 g., 0.05 m) is diazotized exactly as described in Examples 28–37 and a 0.005 m aliquot coupled to a 0.005 m portion of each of the couplers of Examples 1–10 in the manner previously illustrated.

EXAMPLES 52–61

Diazotization of 5-Amino-3-methyl-4-cyanoisothiazole

To 25 ml of concentrated $H_2SO_4$ is added 3.6 g. of $NaNO_2$ allowing the temperature to rise. The solution is cooled and 50 ml of 1:5 acid is added below 10° C. Stirring is continued and 6.95 g. (0.05 m) of 5-amino-3-methyl-4-cyanoisothiazole is added below 5° C., followed by an additional 50 ml of 1:5 acid. After stirring at 0°–5° C. for two hrs., a 0.005 m aliquot of the diazonium salt is coupled to 0.005 m of each of the couplers of Examples 1–10 as previously described to produce rubine to violet dyes for polyamides.

EXAMPLES 62–71

Diazotization of 5-Amino-4-carbomethoxypyrazole

Nitrosyl sulfuric acid is prepared by adding 3.6 g. $NaNO_2$ to 25 ml of concentrated $H_2SO_4$. The solution is cooled and 100 ml of 1:5 acid is added below 20° C. After further cooling, 5-amino-4-carbomethoxypyrazole (7.05 g., 0.05 m) is added at 0°–5° C. and stirring continued for two hrs. A 0.005 m aliquot of the diazonium solution is coupled to 0.005 m of each of the couplers of Examples 1–10 in the manner previously described to produce red dyes for polyamides.

EXAMPLES 72–81

Diazotization of 2-Amino-3-carbomethoxy-5-isobutyrylthiophene

To 150 g. of 60% aqueous acetic acid is added 11.35 g. (0.05 m) of 2-amino-3-carbomethoxy-5-isobutyrylthiophene at room temperature. Ten grams of concentrated $H_2SO_4$ is added and the mixture cooled to 0° C. A solution of 3.6 g $NaNO_2$ in 25 ml of conc. $H_2SO_4$ is added below 10° C. and stirring continued for 1 hr. at 0°–5° C. A 0.005 m aliquot of this diazonium salt is coupled to a 0.005 m portion of each of the couplers of Examples 1–10 as previously illustrated to produce violet to reddish-blue dyes for polyamides.

EXAMPLES 82–91

Diazotization of 2-amine-5-carbethoxy-4-methylthiazole

Sodium nitrite (3.6 g.) is added portionwise to 25 ml of concentrated $H_2SO_4$. The solution is cooled and 100 ml of 1:5 acid is added below 15° C. The mixture is cooled and 9.31 g (0.05 m) of 2-amino-5-carbethoxy-4-methylthiazole is added below 10° C. After stirring at 0°–5° C. for two hrs., a 0.005 m aliquot of the diazonium salt is coupled to 0.005 m of each of the couplers of Examples 1–10 to produce red to violet dyes for polyamide fibers.

METHOD II

EXAMPLE 92

Preparation of Intermediate Dye

Sodium nitrite (0.72 g) is added portionwise to 5 ml of concentrated $H_2SO_4$. The solution is cooled and 20 ml of 1:5 acid is added below 15° C. The mixture is cooled and 1.61 g. (0.01 m) of 2-amino-5-ethylthio-1,3,4-thiadiazole is added below 10° C. After stirring at 0°–5° C. for two hrs., the diazonium solution is added to a chilled solution of N-benzyl-N-ethylaniline (0.01 m) dissolved in 40 ml. of 1:5 acid. The solution is kept cold and ammonium acetate added until neutral to Congo Red test paper. After allowing to stand for 1 hr., the coupling mixture is diluted with water, and the dye is filtered, washed, and dried in air.

EXAMPLE 93

Sulfonation of Dye Containing N-(Aralkylamino) Group

A portion of the dye from Example 92 (1.5 g) is added portionwise to 15 ml. of concentrated $H_2SO_4$ over 20 min., allowing the temperature to rise to 30° C. The reaction mixture is then heated at 70° C., when the reaction is completed as evidenced by thin-layer chromatography. After the reaction mixture is drowned on ice-water mixture, 50% NaOH is added until the pH is about 7. The dye is collected by filtration, washed with water, and dried in air. The structure is as follows:

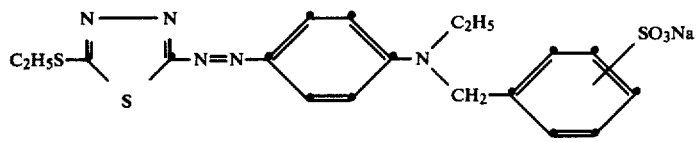

The dye produces bright orange shades on polyamide and has good fastness properties.

TABLE I

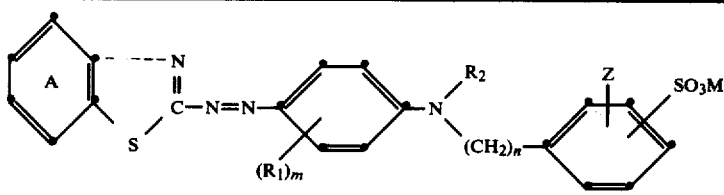

| Substituents on Ring A | $(R_1)_m$ | $R_2$ | Z | n | M |
|---|---|---|---|---|---|
| None | None | $C_2H_5$ | H | 1 | $K^+$ |
| " | " | $C_6H_{11}$ | " | " | " |
| " | " | $C_6H_5$ | " | " | " |
| " | $3CH_3$ | $C_2H_5$ | " | " | " |
| " | " | $CH_2C_6H_5$ | " | " | " |
| " | " | $CH_2CH_2OCH_3$ | " | " | " |
| " | " | $CH_2CH_2CONH_2$ | " | " | " |
| " | " | $CH_2CH_2Cl$ | " | " | " |
| " | $3-NHCOCH_3$ | $C_2H_5$ | " | " | " |
| " | $2-CH_3-5-NHCOCH_3$ | H | " | " | " |
| " | $2-OCH_3-5-CH_3$ | " | " | " | " |
| " | 2-Cl | " | " | " | " |
| " | $2-CH_3$ | " | " | " | " |
| " | 2,5-di-Cl | " | " | " | " |
| " | $2-OCH_3-5-Cl$ | " | " | " | " |
| $6-CH_3$ | $2-OCH_3-5-CH_3$ | " | " | " | " |
| " | $2,5-di-CH_3$ | " | $4-CH_3$ | " | $Na^+$ |
| " | $3-CH_3$ | $CH_2$—furan (O) | $3-CH_3$ | " | " |
| " | $3-CH_3$ | $CH_2CH_2N(COCH_2)_2$ | $2-CH_3$ | " | " |
| " | $3-CH_3$ | $CH_2CH_2N(CO)_2C_6H_4$ | $2,5-di-CH_3$ | " | $NH_4^+$ |
| " | $3-CH_3$ | $CH_2CH_2NHSO_2CH_3$ | $4-OCH_3$ | " | " |
| " | $3-CH_3$ | $CH_2CH_2CH_2NHCOCH_3$ | 2-Cl | " | " |
| $6-OCH_3$ | None | $CH_3$ | $3-NHCOCH_3$ | " | " |
| " | $3-CH_3$ | $CH_2CH(CH_3)_2$ | $3-OCH_3$ | " | " |
| " | " | $CH_2C_6H_{11}$ | 3-Br | " | " |
| " | " | $CH_2CH_2OC_6H_5$ | 4-Br | " | " |
| 6-Cl | " | $CH(CH_3)_2$ | 2,5-di-Cl | " | " |
| " | H | $-CH_2CH_3$ | $4-C_2H_5$ | " | $K^+$ |
| " | " | $CH_2CH_2OCH_2CH_2OC_2H_5$ | $4-C_4H_9-n$ | " | " |
| 5,6-di-Cl | $3-CH_3$ | $-CH_2CH_3$ | $2-C_2H_5$ | " | " |
| $6-SO_2CH_3$ | " | " | H | 2 | " |
| 6-CN | " | " | " | " | " |
| $6-CONH_2$ | " | " | " | " | " |
| $6-COCH_3$ | $3-NHCOC_6H_5$ | " | " | " | " |
| $6-COC_6H_5$ | $3-NHCONHC_2H_5$ | " | " | " | " |
| $6-COOC_2H_5$ | $3-NHCOCH_2OCH_3$ | " | " | " | " |
| $6-SO_2NH_2$ | $3-NHCOC_6H_{11}$ | " | " | " | " |
| $6-SO_2N(CH_3)_2$ | $3-NHCOOC_2H_5$ | " | " | " | " |
| $6-SO_2NHC_2H_4OCH_3$ | $3-NHCOCH_2CN$ | " | " | " | " |
| $6-NHCOCH_3$ | " | " | " | " | " |
| $4-CF_3$ | None | " | " | " | " |
| $6-SO_3C_6H_5$ | " | " | " | " | " |
| $6-OC_2H_5$ | $3-CH_3$ | " | $2-CH_3$ | " | " |
| " | " | " | $3-CH_3$ | " | " |
| " | " | " | $4-CH_3$ | " | " |
| " | " | " | $2,5-di-CH_3$ | " | " |
| " | " | " | 2-Cl | " | " |
| $6-SCH_3$ | " | " | 3-Cl | " | " |
| 6-SCN | " | " | 4-Cl | " | " |
| $6-CH_3$ | " | " | $2-OCH_3$ | " | " |
| " | " | " | $3-OCH_3$ | " | " |

TABLE I-continued

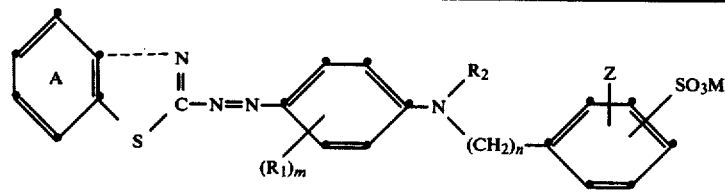

| Substituents on Ring A | $(R_1)_m$ | $R_2$ | Z | n | M |
|---|---|---|---|---|---|
| " | " | " | 4-OCH$_3$ | " | " |
| " | 3-NHCOC$_6$H$_5$ | " | H | 3 | " |
| " | 3-NHCOOC$_2$H$_5$ | " | " | 4 | " |
| " | 3-CH$_3$ | " | " | 5 | Na |
| " | " | " | " | 6 | " |

TABLE 2

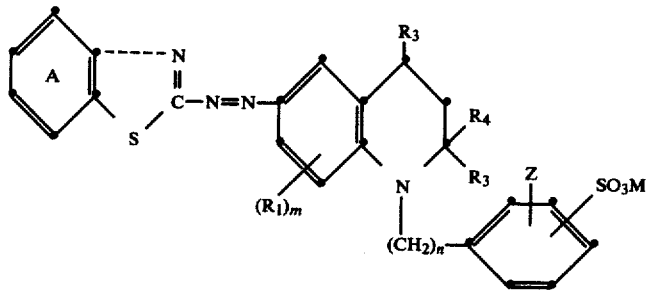

| Substituents on Ring A | $(R_1)_m$ | $R_3$ | $R_4$ | Z | n | M |
|---|---|---|---|---|---|---|
| None | None | CH$_3$ | CH$_3$ | H | 1 | K$^+$ |
| " | " | H | CH$_3$ | " | " | " |
| " | 7-CH$_3$ | " | " | " | " | " |
| " | " | CH$_3$ | " | " | " | " |
| " | 7-CH$_3$ | H | CH(CH$_3$)$_2$ | " | " | " |
| " | 7-OCH$_3$ | " | CH$_3$ | " | " | " |
| " | 5-OCH$_3$, 8-CH$_3$ | " | " | " | " | " |
| " | 5,8-di-OCH$_3$ | " | " | " | " | " |
| " | 5,8-di-CH$_3$ | " | " | " | " | " |
| " | 7-Cl | " | " | " | " | " |
| " | 5,8-di-Cl | " | " | " | " | " |
| 6-CH$_3$ | None | " | " | " | " | " |
| " | 5-OCH$_3$, 8-CH$_3$ | CH$_3$ | " | " | " | Na$^+$ |
| " | 7-NHCHO | " | " | " | " | " |
| " | 7-NHCOCH$_3$ | " | " | " | " | " |
| " | 7-NHCOCH$_2$OCH$_3$ | " | " | H | 2 | " |
| " | 7-NHCOOC$_2$H$_5$ | " | " | " | " | " |
| " | 7-NHCOC$_6$H$_5$ | " | " | " | " | " |
| " | 7-NHCONHC$_2$H$_5$ | " | " | " | " | K$^+$ |
| " | 7-NHCOC$_6$H$_{11}$ | " | " | " | " | " |
| 6-OCH$_3$ | None | " | " | " | " | " |
| " | 7-CH$_3$ | H | " | " | " | " |
| " | " | " | H | " | " | " |
| 6-OCH$_2$CH$_3$ | " | " | CH$_3$ | " | " | " |
| 6-SCH$_3$ | " | " | " | " | " | " |
| 6-SCN | " | " | " | " | " | " |
| 6-SO$_2$NH$_2$ | " | " | " | " | " | " |
| 6-SO$_2$NHC$_4$H$_9$—n | " | " | " | " | " | " |
| 6-SO$_2$N(CH$_3$)$_2$ | 7-OCH$_3$ | " | " | " | " | " |
| 6-SO$_3$C$_6$H$_5$ | 7-CH$_3$ | " | " | " | " | " |
| 6-CN | " | " | " | " | " | " |
| 6-CONH$_2$ | " | " | " | " | " | " |
| 4-COOCH$_3$ | " | " | " | " | " | " |
| 6-COCH$_3$ | " | " | " | " | " | " |
| 6-COC$_6$H$_5$ | " | " | " | " | " | " |
| 6-Cl | None | " | " | " | " | " |
| 5,6-di-Cl | " | " | " | 4-CH$_3$ | 1 | " |
| 4-Br | " | " | " | 3-CH$_3$ | " | " |
| 4-CF | " | " | " | 2-CH$_3$ | " | " |
| 6-NHCOCH$_3$ | 7-CH$_3$ | " | " | 4-OCH$_3$ | " | " |
| 6-SO$_2$CH$_3$ | " | " | " | 2-Cl | " | " |
| 6-CH$_3$ | " | " | " | 2,5-di-CH$_3$ | " | " |
| " | " | " | " | 4-C$_4$H$_9$—n | " | " |

TABLE 2-continued

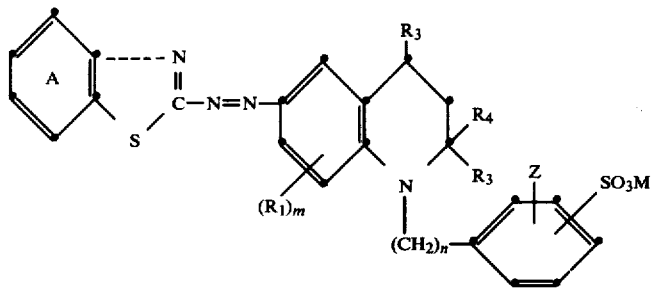

| Substituents on Ring A | $(R_1)_m$ | $R_3$ | $R_4$ | Z | n | M |
|---|---|---|---|---|---|---|
| " | " | " | " | 4-CH$_3$ | 2 | " |
| " | " | " | " | H | 3 | " |
| " | " | " | " | " | 4 | " |
| " | " | " | " | " | 5 | " |
| None | " | " | " | " | 6 | " |
| 6-SC$_2$H$_4$CN | " | " | " | " | 1 | " |
| 6-NHCOCH$_2$CN | " | " | " | " | 1 | " |
| 6-CH$_3$ | " | " | " | 4-CH$_3$ | 4 | Na$^+$ |
| " | " | " | " | 4-Cl | 4 | " |
| " | " | " | " | 4-OCH$_3$ | 4 | " |
| " | " | " | " | 2,5-di-Cl | 3 | " |
| " | " | " | " | 4-CH$_3$ | 5 | " |
| " | " | " | " | 2-Cl | 6 | " |
| 6-COOC$_2$H$_4$OCH$_3$ | " | " | " | 3-Cl | 6 | " |

TABLE 3

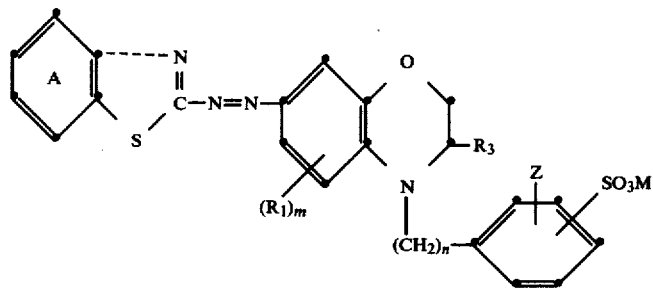

| Substituents on Ring A | $(R_1)_m$ | $R_3$ | Z | n | M |
|---|---|---|---|---|---|
| None | None | H | H | 1 | Na$^+$ |
| " | 6-CH$_3$ | " | " | " | " |
| " | " | 3-CH$_3$ | " | " | " |
| " | 6-OCH$_3$ | " | " | " | " |
| 6-CH$_3$ | " | H | " | " | " |
| " | 6-CH$_3$ | 3-CH$_3$ | " | " | " |
| 4-CH$_3$ | " | " | " | " | " |
| 4-Cl | " | " | " | " | " |
| 4-CF$_3$ | " | " | " | " | " |
| 4,7-di-CH$_3$ | " | " | " | " | " |
| 4,7-di-Cl | " | " | " | " | " |
| 4-OCH$_3$, 7-Cl | " | " | " | " | " |
| 4-OCH$_3$, 5-CH$_3$ | " | " | " | " | " |
| 6-OCH$_3$ | " | " | " | " | " |
| " | 6-NHCOCH$_3$ | " | " | " | " |
| " | 6-NHCOC$_6$H$_5$ | " | " | " | " |
| " | 6-NHCOC$_4$H$_9$—n | " | " | " | " |
| " | 6-NHCONHC$_2$H$_5$ | " | " | " | " |
| " | 6-NHCOCH$_2$OCH$_3$ | " | " | " | " |
| 6-OC$_4$H$_9$—n | 6-NHCOCH$_2$CN | " | " | " | " |
| 6-SCH$_3$ | 6-CH$_3$ | " | " | " | Na$^+$ |
| 6-SCN | " | " | " | " | " |
| 6-SO$_2$CH$_3$ | " | " | " | " | " |
| 6-SO$_2$NH$_2$ | " | " | " | " | " |
| 6-SO$_2$NHC$_2$H$_5$ | " | " | " | " | " |
| 6-SO$_2$N(C$_2$H$_5$)$_2$ | " | " | " | " | " |
| 6-SO$_2$NHC$_2$H$_4$OCH$_3$ | " | " | " | " | " |
| 6-SO$_3$C$_6$H$_5$ | " | " | " | " | " |
| 5,6-di-Cl | " | " | " | " | " |

TABLE 3-continued

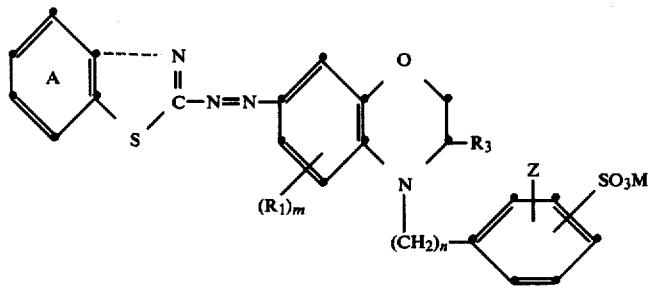

| Substituents on Ring A | $(R_1)_m$ | $R_3$ | Z | n | M |
|---|---|---|---|---|---|
| " | 6-NHCHO | " | " | " | " |
| 6-CN | 6-$CH_3$ | " | " | " | " |
| 6-$CONH_2$ | " | " | " | " | " |
| 6-$COOC_2H_5$ | " | " | " | " | " |
| 6-$COCH_3$ | " | " | " | " | " |
| 6-$COC_6H_5$ | " | " | " | " | " |
| 4-Br—6-$SO_2CH_3$ | " | " | " | " | " |
| 6-$SCH_2CH_2CN$ | " | " | " | " | " |
| 6-$SO_2CH_2CH_2CN$ | " | " | 2-$CH_3$ | " | " |
| 6-$CH_3$ | " | " | 2-Cl | " | " |
| " | " | " | 4-$OCH_3$ | " | " |
| " | " | " | 3-$CH_3$ | " | " |
| " | " | " | 2,5-di-Cl | " | " |
| " | " | " | H | 2 | " |
| " | " | " | " | 3 | " |
| " | " | " | " | 4 | " |
| " | " | " | " | 5 | " |
| " | " | " | " | 6 | " |
| " | " | " | 2-$CH_3$ | 2 | " |
| " | " | " | 3-$CH_3$ | 2 | " |
| " | " | " | 4-$CH_3$ | 2 | " |
| " | " | " | 2-Cl | 3 | " |
| " | " | " | 3-Cl | 4 | " |
| " | " | " | 4-Cl | 5 | " |
| " | " | " | 4-$OCH_3$ | 2 | " |
| " | " | " | 4-$OC_2H_5$ | 2 | " |
| 6-$COOCH_2CH_2OC_2H_5$ | " | " | 4-$OC_4H_9$—n | 2 | " |
| " | " | " | 4-$OCH(CH_3)_2$ | 2 | " |

TABLE 4

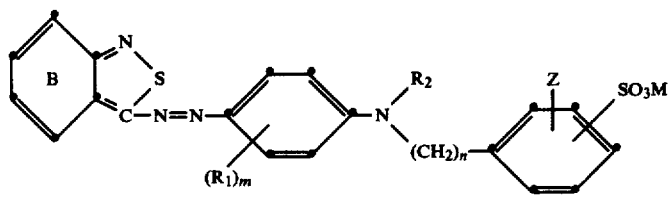

| Substituents on Ring B | $(R_1)_m$ | $R_2$ | Z | n | M |
|---|---|---|---|---|---|
| 6-$CH_3$ | None | $C_2H_5$ | H | 1 | $K^+$ |
| None | " | $C_6H_{11}$ | " | " | " |
| " | " | $C_6H_5$ | " | " | " |
| 6-$CH_3$ | 3$CH_3$ | $C_2H_5$ | " | " | " |
| None | " | $CH_2C_6H_5$ | " | " | " |
| " | " | $CH_2CH_2OCH_3$ | " | " | " |
| " | " | $CH_2CH_2CONH_2$ | " | " | " |
| " | " | $CH_2CH_2Cl$ | " | " | " |
| " | 3-$NHCOCH_3$ | $C_2H_5$ | " | " | " |
| " | 2-$CH_3$—5-$NHCOCH_3$ | H | " | " | " |
| 6-$OCH_3$ | 2-$OCH_3$—5-$CH_3$ | " | " | " | " |
| " | 2-Cl | " | " | " | " |
| None | 2-$CH_3$ | " | " | " | " |
| " | 2,5-di-Cl | " | " | " | " |
| " | 2-$OCH_3$—5-Cl | " | " | " | " |
| 6-$CH_3$ | 2-$OCH_3$—5-$CH_3$ | " | " | " | " |
| None | 2,5-di-$CH_3$ | " | " | " | $Na^+$ |

TABLE 4-continued

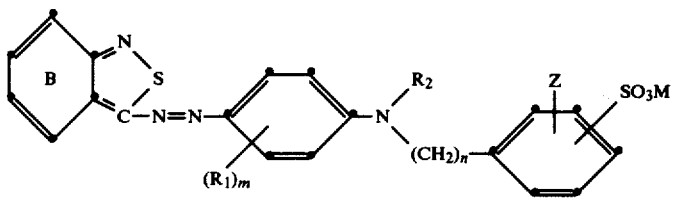

| Substituents on Ring B | $(R_1)_m$ | $R_2$ | Z | n | M |
|---|---|---|---|---|---|
| " | 3-CH$_3$ | (CH$_2$-furan) | " | " | " |
| " | 3-CH$_3$ | CH$_2$CH$_2$N(COCH$_2$)(COCH$_2$) | " | " | " |
| " | 3-CH$_3$ | CH$_2$CH$_2$N(CO-phthaloyl) | " | " | NH$_4$ |
| " | 3-CH$_3$ | CH$_2$CH$_2$N(CO—CH$_2$)(CH$_2$CH$_2$) | " | " | K$^+$ |
| " | 3-CH$_3$ | CH$_2$CH$_2$NHSO$_2$CH$_3$ | " | " | " |
| " | 3-CH$_3$ | CH$_2$CH$_2$CH$_2$NHCOCH$_3$ | " | " | " |
| 5-Cl | None | CH$_3$ | " | " | " |
| 5-Br | 3-CH$_3$ | CH$_2$CH(CH$_3$)$_2$ | " | " | " |
| 6-SO$_2$NH$_2$ | " | CH$_2$C$_6$H$_{11}$ | " | " | " |
| 6-SO$_2$NHC$_2$H$_5$ | " | CH$_2$CH$_2$OC$_6$H$_5$ | " | " | " |
| 6-SO$_2$N(CH$_3$)$_2$ | " | CH(CH$_3$)$_2$ | " | " | " |
| 6-SO$_2$NHC$_3$H$_6$OCH$_3$ | H | —CH$_2$CH$_3$ | 2-CH$_3$ | 1 | K$^+$ |
| 5-Cl | " | CH$_2$CH$_2$OCH$_2$CH$_2$OC$_2$H$_5$ | 3-CH$_3$ | " | " |
| " | 3-CH$_3$ | —CH$_2$CH$_3$ | 4-CH$_3$ | " | " |
| " | " | " | 2-Cl | " | " |
| " | " | " | 3-Cl | " | " |
| " | " | " | H | 2 | " |
| None | 3-NHCOC$_6$H$_5$ | " | " | " | " |
| " | 3-NHCONHC$_2$H$_5$ | " | " | " | " |
| " | 3-NHCOCH$_2$OCH$_3$ | " | " | " | " |
| " | 3-NHCOC$_6$H$_{11}$ | " | " | " | " |
| " | 3-NHCOOC$_2$H$_5$ | " | " | " | " |
| " | 3-NHCOCH$_2$CN | " | " | " | " |
| 6-SO$_2$NHCH$_3$ | " | " | " | " | " |
| " | None | " | " | 3 | " |
| " | " | " | " | 4 | " |
| None | 3-CH$_3$ | " | " | 5 | " |
| " | " | " | " | 6 | " |
| " | " | " | 2-CH$_3$ | 2 | " |
| " | " | " | 3-CH$_3$ | 3 | " |
| " | " | " | 2-Cl | 4 | " |
| " | " | " | 3-Cl | 5 | " |
| " | " | " | 4-Cl | 6 | " |

TABLE 5

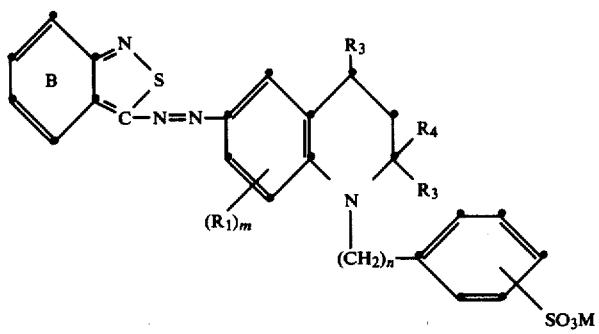

| Substituents on Ring B | $(R_1)_m$ | $R_3$ | $R_4$ | Z | n | M |
|---|---|---|---|---|---|---|
| 6-$CH_3$ | None | $CH_3$ | $CH_3$ | H | 1 | $K^+$ |
| " | " | H | $CH_3$ | " | " | " |
| " | 7-$CH_3$ | " | " | " | " | " |
| " | " | $CH_3$ | " | " | " | " |
| " | 7-$CH_3$ | H | $CH(CH_3)_2$ | " | " | " |
| None | 7-$OCH_3$ | " | $CH_3$ | " | " | " |
| " | 5-$OCH_3$, 8-$CH_3$ | " | " | " | " | " |
| " | 5,8-di-$OCH_3$ | " | " | " | " | " |
| " | 5,8-di-$CH_3$ | " | " | " | " | " |
| " | 7-Cl | " | " | " | " | " |
| " | 5,8-di-Cl | " | " | " | " | " |
| " | None | " | " | " | " | $Na^+$ |
| " | 5-$OCH_3$, 8-$CH_3$ | $CH_3$ | " | " | " | " |
| " | 7-NHCHO | " | " | " | " | " |
| " | 7-$NHCOCH_3$ | " | " | " | " | " |
| " | 7-$NHCOCH_2OCH_3$ | " | " | " | " | " |
| " | 7-$NHCOOC_2H_5$ | " | " | " | " | " |
| " | 7-$NHCOC_6H_5$ | " | " | " | " | " |
| " | 7-$NHCONHC_2H_5$ | " | " | " | " | $K^+$ |
| " | 7-$NHCOC_6H_{11}$ | " | " | " | " | " |
| 5-Cl | None | " | " | " | " | " |
| " | 7-$CH_3$ | H | " | " | " | " |
| " | " | " | H | " | " | " |
| " | " | " | " | $CH_3$ | " | " |
| 5-Br | " | " | " | " | " | " |
| 6-$SO_2NH_2$ | " | " | " | " | " | " |
| 6-$SO_2NHC_2H_5$ | " | " | " | " | " | " |
| 6-$SO_2N(CH_3)_2$ | " | " | " | " | " | " |
| 6-$SO_2N(CH_3)C_2H_4OH$ | 7-$OCH_3$ | " | " | " | " | " |
| 6-$SO_2NHC_3H_6OCH_3$ | 7-$CH_3$ | " | " | " | " | " |
| 6-$OCH_3$ | " | " | " | " | " | " |
| " | " | " | " | 2-$CH_3$ | " | " |
| " | " | " | " | 3-$CH_3$ | " | " |
| 5-Cl | " | " | " | 4-$CH_3$ | " | " |
| " | " | " | " | 2-Cl | " | " |
| " | None | " | " | 3-Cl | " | " |
| " | " | " | " | 4-$OCH_3$ | 1 | " |
| " | " | " | " | 4-$OC_4H_9$—n | " | " |
| " | " | " | " | 2,5-di-$CH_3$ | " | " |
| " | 7-$CH_3$ | " | " | H | 2 | " |
| " | " | " | " | " | 3 | " |
| None | " | " | " | " | 4 | " |
| " | " | " | " | " | 5 | " |
| " | " | " | " | " | 6 | " |

TABLE 6

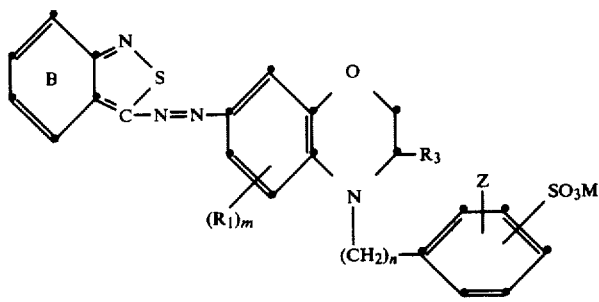

| Substituents on Ring B | (R₁)ₘ | R₃ | Z | n | M |
|---|---|---|---|---|---|
| None | None | H | H | 1 | Na⁺ |
| " | 6-CH₃ | " | " | " | " |
| 6-CH₃ | " | 3-CH₃ | " | " | " |
| " | 6-OCH₃ | " | " | " | " |
| None | " | H | " | 2 | " |
| " | 6-CH₃ | 3-CH₃ | " | 3 | " |
| " | " | " | " | 4 | " |
| " | " | " | " | 5 | " |
| " | " | " | " | 6 | " |
| " | " | " | 2-CH₃ | 1 | " |
| " | " | " | 3-CH₃ | 2 | " |
| " | " | " | 4-CH₃ | 2 | " |
| " | " | " | 2-Cl | 1 | " |
| " | " | " | 3-Cl | 2 | " |
| " | 6-NHCOCH₃ | " | 4-Cl | 4 | K⁺ |
| " | 6-NHCOC₆H₅ | " | " | 1 | " |
| " | 6-NHCOC₄H₉—n | " | " | " | " |
| " | 6-NHCONHC₂H₅ | " | " | " | " |
| 5-Br | 6-NHCOCH₂OCH₃ | " | " | " | " |
| 6-OCH₃ | 6-NHCOCH₂CN | " | " | " | " |
| 6-SO₂NH₂ | 6-CH₃ | " | " | " | Na⁺ |
| 6-SO₂NHC₄H₉—n | " | " | " | " | " |
| 6-SO₂NHC₃H₆OCH₃ | " | " | " | " | " |
| 6-SO₂N(C₂H₅)₂ | " | " | " | " | " |
| 6-SO₂N(C₂H₄OH)₂ | " | " | " | " | " |
| 6-SO₂NHC₆H₁₁ | " | " | " | " | " |
| 6-SO₂N(CH₃)C₂H₄OH | " | " | " | " | " |
| 5-Cl | " | " | " | " | " |
| " | " | " | " | " | " |
| " | 6-NHCHO | " | " | " | " |
| " | 6-CH₃ | " | " | " | " |

TABLE 7

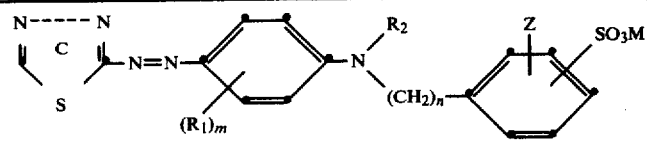

| Substituents on Ring C | (R₁)ₘ | R₂ | Z | n | M |
|---|---|---|---|---|---|
| 5-CH₃ | None | C₂H₅ | H | 1 | K⁺ |
| 5-Cl | " | C₆H₁₁ | " | " | " |
| 5-CH₂CH(CH₃)₂ | " | C₆H₅ | " | " | " |
| 5-C₆H₅ | 3CH₃ | C₂H₅ | " | " | " |
| 5-C₆H₁₁ | " | CH₂C₆H₅ | " | " | " |
| 5-C₆H₄—p-Cl | " | CH₂CH₂OCH₃ | " | " | " |
| 5-C₆H₄O—CH₃ | " | CH₂CH₂CONH₂ | " | " | " |
| 5-C₆H₄—m-OCH₃ | " | CH₂CH₂Cl | " | " | " |
| 5-SCH₃ | 3-NHCOCH₃ | C₂H₅ | " | " | " |
| " | 2-CH₃—5-NHCOCH₃ | H | " | " | " |
| " | 2-OCH₃—5-CH₃ | " | " | " | " |
| " | 2-Cl | " | " | " | " |
| " | 2-CH₃ | " | " | " | " |
| " | 2,5-di-Cl | " | " | " | " |
| " | 2-OCH₃—5-Cl | " | " | " | " |
| " | 2-OC₂H₅—5-CH₃ | " | " | " | " |
| 5-OC₂H₅ | 2,5-di-CH₃ | " | " | " | Na⁺ |

TABLE 7-continued

| Substituents on Ring C | (R₁)ₘ | R₂ | Z | n | M |
|---|---|---|---|---|---|
| 5-SC₂H₅ | 3-CH₃ | CH₂-(furan) | " | " | " |
| " | 3-CH₃ | CH₂CH₂N(COCH₂)(COCH₂) (succinimide) | " | " | " |
| " | 3-CH₃ | CH₂CH₂N-phthalimide | " | " | NH₄⁺ |
| " | 3-CH₃ | CH₂CH₂N(CO—CH₂)(CH₂CH₂) (glutarimide-like) | " | " | K⁺ |
| " | 3-CH₃ | CH₂CH₂NHSO₂CH₃ | " | " | " |
| " | 3-CH₃ | CH₂CH₂CH₂NHCOCH₃ | " | " | " |
| " | None | CH₃ | " | " | " |
| 5-Cl | 3-CH₃ | CH₂CH(CH₃)₂ | " | " | " |
| 5-SO₂CH₃ | " | CH₂C₆H₁₁ | " | " | " |
| 5-OC₄H₉—n | " | CH₂CH₂OC₆H₅ | " | " | " |
| 5-SCH₂CH₂OH | " | CH(CH₃)₂ | " | " | " |
| 5-SCH₂CH₂COOCH₃ | H | —CH₂CH₃ | " | " | K⁺ |
| 5-S—CH₂CH₂OCOCH₃ | " | CH₂CH₂OCH₂CH₂OC₂H₅ | " | " | " |
| 5-SCH₂SC₆H₅ | 3-CH₃ | —CH₂CH₃ | 2-CH₃ | " | " |
| 5-SO₂CH₃ | " | " | 3-CH₃ | " | " |
| 5-SO₂NH₂ | " | " | 4-CH₃ | " | " |
| 5-SO₂NHC₂H₅ | " | " | 2-Cl | " | " |
| 5-SCN | 3-NHCOC₆H₅ | " | 3-Cl | " | " |
| 5-SO₂N(CH₃)₂ | 3-NHCONHC₂H₅ | " | 4-Cl | " | " |
| 5-SO₃(C₆H₅) | 3-NHCOCH₂OCH₃ | " | 2,5-di-Cl | " | " |
| 5-SCH₂CH=CH₂ | 3-NHCOC₆H₁₁ | " | 2,5-di-CH₃ | " | " |
| 5-SCH₂CH₂OCH₃ | 3-NHCOOC₂H₅ | " | 2-OCH₃ | " | " |
| 5-SCH₂CH₂N(COCH₂)(COCH₂) | 3-NHCOCH₂CN | " | 3-NHCOCH₃ | " | " |
| 5-SC₆H₁₁ | " | " | 4-OCH₃ | " | " |
| 5-SC₆H₅ | None | " | 4-OCH(CH₃)₂ | " | " |
| 5-SO₂C₆H₅ | " | " | 4-OC₄H₉—n | " | " |
| 5-I | 3-CH₃ | " | H | 2 | " |
| 5-Br | " | " | " | 3 | " |
| 5-SCH₂CH₂N(CO—CH₂)(CH₂CH₂) | " | " | " | 4 | " |
| 5-SCH₂CH₂NHSO₂CH₃ | " | " | " | 5 | " |
| 5-SCH₂CH₂NHCOCH₃ | " | " | " | 6 | " |

TABLE 8

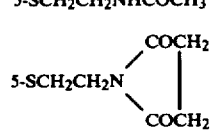

| Substituents on Ring C | $(R_1)_m$ | $R_3$ | $R_4$ | Z | n | M |
|---|---|---|---|---|---|---|
| None | None | $CH_3$ | $CH_3$ | H | 1 | $K^+$ |
| " | " | H | $CH_3$ | " | " | " |
| " | 7-$CH_3$ | " | " | " | " | " |
| 5-$CH_3$ | " | $CH_3$ | " | " | " | " |
| 5-$CH_2CH_3$ | 7-CH | H | $CH(CH_3)_2$ | " | " | " |
| 5-$CH(CH_3)_2$ | 7-$OCH_3$ | " | $CH_3$ | " | " | " |
| 5-$CH_2CH(CH_3)_2$ | 5-$OCH_3$, 8-$CH_3$ | " | " | " | " | " |
| 5-$C_6H_5$ | 5,8-di-$OCH_3$ | " | " | " | " | " |
| 5-$C_6H_{11}$ | 5,8-di-$CH_3$ | " | " | " | " | " |
| 5-$C_6H_4$—o-Cl | 7-Cl | " | " | " | " | " |
| 5-$C_6H_4$—m-$CH_3$ | 5,8-di-Cl | " | " | " | " | " |
| 5-$C_6H_4$—p-$OCH_3$ | None | " | " | " | " | $Na^+$ |
| 5-$OC_2H_5$ | 5-$OCH_3$, 8-$CH_3$ | $CH_3$ | " | " | " | " |
| " | 7-NHCHO | " | " | " | " | " |
| " | 7-$NHCOCH_3$ | " | " | " | " | " |
| " | 7-$NHCOCH_2OCH_3$ | " | " | " | " | " |
| " | 7-$NHCOOC_2H_5$ | " | " | " | " | " |
| " | 7-$NHCOC_6H_5$ | " | " | " | " | " |
| " | 7-$NHCONHC_2H_5$ | " | " | " | " | $K^+$ |
| 5-Cl | 7-$NHCOC_6H_{11}$ | " | " | " | " | " |
| " | None | " | " | " | " | " |
| " | 7-$CH_3$ | H | " | " | 2 | " |
| " | " | " | H | " | " | " |
| 5-I | " | " | $CH_3$ | " | " | " |
| 5-Br | " | " | " | " | " | " |
| 5-$SO_2CH_3$ | " | " | " | " | " | " |
| 5-$SO_2NH_2$ | " | " | " | " | " | " |
| 5-$SO_2N(CH_3)_2$ | " | " | " | " | " | " |
| 5-$SO_2N(C_2H_5)_2$ | 7-$OCH_3$ | " | " | " | " | " |
| 5-$SO_2NHC_3H_6OCH_3$ | 7-$CH_3$ | " | " | " | " | " |
| 5-$SO_2CH_2CH_2OC_2H_5$ | " | " | " | " | " | " |
| 5-$SC_6H_5$ | " | " | " | " | " | " |
| 5-$SC_6H_{11}$ | " | " | " | " | " | " |
| 5-$SO_2C_6H_5$ | " | " | " | " | " | " |
| 5-$SO_3C_6H_5$ | " | " | " | " | " | " |
| 5-$SCH_2CH_2OH$ | None | " | " | " | " | " |
| 5-$SCH_2CH=CH_2$ | " | " | " | " | " | " |
| 5-$SCH_2COOC_2H_5$ | " | " | " | " | " | " |
| 5-$SCH_2C_6H_5$ | " | " | " | " | " | " |
| 5-$SCH_2C_6H_{11}$ | 7-CH | " | " | " | " | " |
| 5-$SCH_2CH_2OC_2H_5$ | " | " | " | 2-$CH_3$ | " | " |
| 5-SCN | " | " | " | 3-$CH_3$ | " | " |
| 5-$SCH_2CH_2NHCOCH_3$ | " | " | " | 4-$CH_3$ | " | " |
| 5-$SCH_2CH_2N\begin{array}{c}COCH_2\\ \\COCH_2\end{array}$ | " | " | " | 2-Cl | " | " |
| 5-$SCH_2CH_2OC_6H_5$ | " | " | " | 3-Cl | " | " |
| 5-$SCH_2CH_3$ | " | " | " | 4-OCH | " | " |
| " | " | " | " | 4-$C_2H_5$ | " | " |
| " | " | " | " | 4-$NHCOCH_3$ | " | " |
| " | " | " | " | 4-Br | " | " |
| " | " | " | " | 4-I | " | " |
| " | " | " | " | 2,5-di-$CH_3$ | " | $Na^+$ |
| " | " | " | " | 2,5-di-Cl | " | " |
| 5-$SCH_3$ | " | " | " | H | 2 | " |
| " | " | " | " | " | 3 | " |
| " | " | " | " | " | 4 | " |
| " | " | " | " | " | 5 | " |
| 5-$NHCOCH_3$ | " | " | " | " | 6 | " |

TABLE 9

[Structure: thiadiazole-C(S)-N=N-phenyl(R1)m-O-CH(R3)-CH2-N(CH2)n-phenyl(Z)-SO3M]

| Substituents on Ring C | (R₁)ₘ | R₃ | Z | n | M |
|---|---|---|---|---|---|
| None | None | H | H | 1 | Na⁺ |
| " | 6-CH₃ | " | " | " | " |
| 5-Cl | " | 3-CH₃ | " | " | " |
| 5-CH₃ | 6-OCH₃ | " | " | " | " |
| 5-CH(CH₃)₂ | " | H | " | " | " |
| 5-CH₂CH(CH₃)₂ | 6-CH₃ | 3-CH₃ | " | " | " |
| 5-C₆H₅ | " | " | " | " | " |
| 5-C₆H₄—p-Cl | " | " | " | " | " |
| 5-C₆H₄—p-OCH₃ | " | " | " | " | " |
| 5-C₆H₄—m-CH₃ | " | " | " | " | " |
| 5-OC₂H₅ | " | " | " | " | " |
| 5-OCH(CH₃)₂ | " | " | " | " | " |
| 5-C₆H₁₁ | " | " | " | " | " |
| 5-SCN | " | " | " | " | " |
| 5-SCH₃ | 6-NHCOCH₃ | " | " | " | K⁺ |
| 5-SCH₂CH(CH₃)₂ | 6-NHCOC₆H₅ | " | " | " | " |
| 5-SCH₂CH=CH₂ | 6-NHCOC₄H₉—n | " | " | " | " |
| 5-SC₆H₁₁ | 6-NHCONHC₂H₅ | " | " | " | " |
| 5-SC₆H₅ | 6-NHCOCH₂OCH₃ | " | " | " | " |
| 5-SCH₂C₆H₅ | 6-NHCOCH₂CN | " | " | " | " |
| 5-SCH₂CH₂OC₆H₅ | 6-CH₃ | " | " | " | Na⁺ |
| 5-SCH₂CH₂OC₂H₅ | " | " | " | " | " |
| 5-SCH₂CH₂OH | " | " | " | " | " |
| 5-SCH₂CH₂Cl | " | " | " | " | " |
| 5-SCH₂COOC₂H₅ | " | " | " | " | " |
| 5-SCH₂CH₂OCOCH₃ | " | " | " | " | " |
| 5-SCH₂C₆H₁₁ | " | " | " | " | " |
| 5-SO₂CH₃ | " | " | " | " | " |
| 5-SO₂C₄H₉—n | " | " | " | " | " |
| 5-SO₂CH₂CH₂OCH₃ | 6-NHCHO | " | " | " | " |
| 5-SO₂C₆H₅ | 6-CH₃ | " | " | " | " |
| 5-SO₂C₆H₁₁ | " | " | " | " | " |
| 5-SO₂CH₂C₆H₅ | " | " | " | " | " |
| 5-SO₂CH₂CH₂OH | " | " | " | " | " |
| 5-SCH₂CH₂N(COCH₂-COCH₂) | " | " | " | " | " |
| 5-SCH₂CH₂NHCOCH₃ | " | " | " | " | " |
| 5-SCH₂CH₂N(CO—CH₂-CH₂CH₂) | " | " | " | " | " |
| 5-SO₂NH₂ | " | " | " | " | " |
| 5-SO₂NHC₃H₆OCH₃ | " | " | " | " | " |
| 5-SO₂NH(CH₃)₂ | " | " | " | " | " |
| 5-SO₂NHC₂H₅ | " | " | " | " | " |
| 5-SO₂NHC₆H₁₁ | " | " | " | " | " |
| 5-SO₃C₆H₅ | " | " | " | " | " |
| 5-SO₂NHC₆H₅ | " | " | " | " | " |
| 5-NHCOCH₃ | " | " | " | " | " |
| 5-SC₂H₅ | " | " | 2-CH₃ | " | " |
| " | " | " | 3-CH₃ | " | " |
| " | " | " | 4-CH₃ | " | " |
| " | " | " | 2-Cl | " | " |
| " | " | " | 4-OCH₃ | " | " |
| " | " | " | 2,5-di-Cl | " | " |
| " | " | " | 2,5-di-CH₃ | " | " |
| " | " | " | H | 2 | " |
| " | " | " | " | 3 | " |

TABLE 9-continued

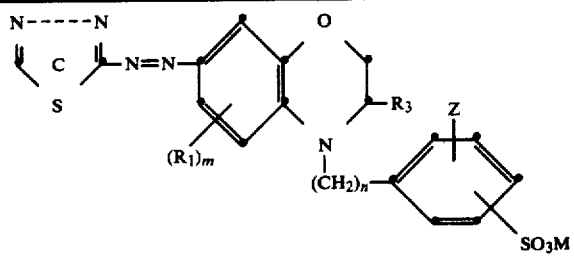

| Substituents on Ring C | $(R_1)_m$ | $R_3$ | Z | n | M |
|---|---|---|---|---|---|
| " | " | " | " | 4 | " |
| " | " | " | " | 5 | " |
| " | " | " | " | 6 | " |

TABLE 10

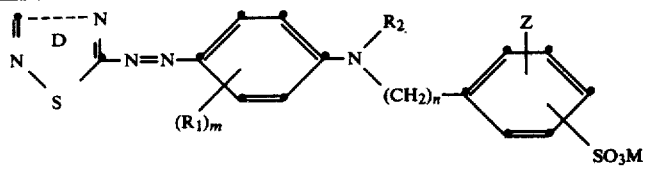

| Substituents on Ring D | $(R_1)_m$ | $R_2$ | Z | n | M |
|---|---|---|---|---|---|
| 3-$CH_3$ | None | $C_2H_5$ | H | 1 | $K^+$ |
| " | " | $C_6H_{11}$ | " | " | " |
| " | " | $C_6H_5$ | " | " | " |
| " | 3$CH_3$ | $C_2H_5$ | " | " | " |
| " | " | $CH_2C_6H_5$ | " | " | " |
| " | " | $CH_2CH_2OCH_3$ | " | " | " |
| " | " | $CH_2CH_2CONH_2$ | " | " | " |
| " | " | $CH_2CH_2Cl$ | " | " | " |
| 3-$SCH_3$ | " | $C_2H_5$ | " | " | " |
| 3-$C_6H_5$ | 3-$NHCOCH_3$ | $C_2H_5$ | " | " | " |
| 3-$C_6H_4$—p-Cl | 2-$CH_3$—5-$NHCOCH_3$ | H | " | " | " |
| 3-$C_6H_4$—o-CN | 2-$OCH_3$—5-$CH_3$ | " | " | " | " |
| " | 2-Cl | " | " | " | " |
| " | 2-$CH_3$ | " | " | " | " |
| " | 2,5-di-Cl | " | " | " | " |
| " | 2-$OCH_3$—5-Cl | " | " | " | " |
| " | 2-$OC_2H_5$—5-$CH_3$ | " | " | " | " |
| " | 2,5-di-$CH_3$ | " | " | " | $Na^+$ |
| 3-$C_6H_5$ | 3-$CH_3$ | $CH_2$—furan | " | " | " |
| " | 3-$CH_3$ | $CH_2CH_2N(COCH_2)_2$ | " | " | " |
| " | 3-$CH_3$ | $CH_2CH_2N$-phthalimide | " | " | $NH_4^+$ |
| " | 3-$CH_3$ | $CH_2CH_2N$-pyrrolidinone | " | " | $K^+$ |
| " | 3-$CH_3$ | $CH_2CH_2NHSO_2CH_3$ | " | " | " |
| 3-$C_6H_4$—p-$CH_3$ | 3-$CH_3$ | $CH_2CH_2CH_2NHCOCH_3$ | " | " | " |
| 3-$C_6H_5$ | None | $CH_3$ | " | " | " |
| " | 3-$CH_3$ | $CH_2CH(CH_3)_2$ | " | " | " |

TABLE 10-continued

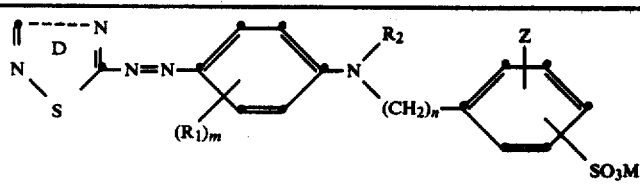

| Substituents on Ring D | $(R_1)_m$ | $R_2$ | Z | n | M |
|---|---|---|---|---|---|
| " | " | $CH_2C_6H_{11}$ | " | " | " |
| " | " | $CH_2CH_2OC_6H_5$ | " | " | " |
| " | " | $CH(CH_3)_2$ | " | " | " |
| " | H | $-CH_2CH_3$ | " | " | $K^+$ |
| " | " | $CH_2CH_2OCH_2CH_2OC_2H_5$ | " | " | " |
| 3-$SO_2CH_3$ | 3-$CH_3$ | $-CH_2CH_3$ | " | " | " |
| 3-$SCH_2CH_2COOCH_3$ | " | " | " | " | " |
| 3-$SCH_2C_6H_5$ | " | " | " | " | " |
| 3-$SCH_2CH_2OCH_3$ | " | " | " | " | " |
| 3-$SC_6H_{11}$ | 3-$NHCOC_6H_5$ | " | " | " | " |
| 3-$SC_2H_5$ | 3-$NHCONHC_2H_5$ | " | " | " | " |
| " | 3-$NHCOCH_2OCH_3$ | " | " | " | " |
| " | 3-$NHCOC_6H_{11}$ | " | " | " | " |
| " | 3-$NHCOOC_2H_5$ | " | " | " | " |
| " | 3-$NHCOCH_2CN$ | " | " | " | " |
| 3-$SCH_2COOCH_3$ | " | " | " | " | " |
| " | None | " | " | 2 | " |
| " | " | " | " | 3 | " |
| " | 3-$CH_3$ | " | " | 4 | " |
| 3-$SCH_3$ | " | " | " | 5 | " |
| " | " | " | " | 6 | " |
| " | " | " | 2-$CH_3$ | 1 | " |
| " | " | " | 3-Cl | " | " |
| 3-$SCH_2CH(CH_3)_2$ | " | " | 4-Cl | " | " |
| " | " | " | 2,5-di-Cl | " | " |
| " | " | " | 4-$OCH_3$ | " | " |

TABLE 11

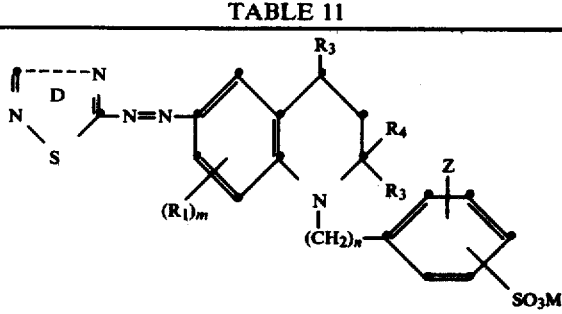

| Substituents on Ring D | $(R_1)_m$ | $R_3$ | $R_4$ | Z | n | M |
|---|---|---|---|---|---|---|
| 3-$CH_3$ | None | $CH_3$ | $CH_3$ | H | 1 | $K^+$ |
| " | " | H | $CH_3$ | " | " | " |
| " | 7-$CH_3$ | " | " | " | " | " |
| " | " | $CH_3$ | " | " | " | " |
| " | 7-$CH_3$ | H | $CH(CH_3)_2$ | " | " | " |
| " | 7-$OCH_3$ | " | $CH_3$ | " | " | " |
| " | 5-$OCH_3$, 8-$CH_3$ | " | " | " | " | " |
| " | 5,8-di-$OCH_3$ | " | " | " | " | " |
| " | 5,8-di-$CH_3$ | " | " | " | " | " |
| 3-Cl | 7-Cl | " | " | " | " | " |
| 3-$SCH_3$ | 5,8-di-Cl | " | " | " | " | " |
| 3-$C_6H_5$ | None | " | " | " | " | $Na^+$ |
| " | 5-$OCH_3$, 8-$CH_3$ | $CH_3$ | " | " | " | " |
| " | 7-NHCHO | " | " | " | " | " |
| " | 7-$NHCOCH_3$ | " | " | " | " | " |
| " | 7-$NHCOCH_2OCH_3$ | " | " | " | " | " |
| " | 7-$NHCOOC_2H_5$ | " | " | " | " | " |
| " | 7-$NHCOC_6H_5$ | " | " | " | " | " |
| " | 7-$NHCONHC_2H_5$ | " | " | " | " | $K^+$ |
| " | 7-$NHCOC_6H_{11}$ | " | " | " | " | " |
| " | None | " | " | " | " | " |
| " | 7-$CH_3$ | H | " | " | " | " |
| $C_6H_4-o-CN$ | " | " | H | " | " | " |
| " | " | " | $CH_3$ | " | " | " |

TABLE 11-continued

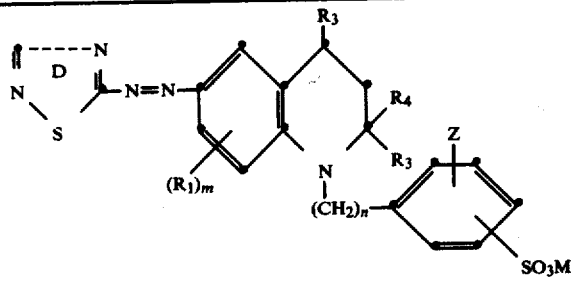

| Substituents on Ring D | $(R_1)_m$ | $R_3$ | $R_4$ | Z | n | M |
|---|---|---|---|---|---|---|
| " | " | " | " | " | " | " |
| " | " | " | " | " | " | " |
| 3-$C_6H_4$—p-$CH_3$ | " | " | " | " | " | " |
| 3-$C_6H_4$—o-Cl | " | " | " | " | " | " |
| 3-$SO_2CH_3$ | 7-$OCH_3$ | " | " | " | " | " |
| 3-$SC_6H_{11}$ | 7-$CH_3$ | " | " | " | " | " |
| 3-$SCH_2CH_2OCH_3$ | " | " | " | " | " | " |
| 3-$SCH_2CH_2COOCH_3$ | " | " | " | " | " | " |
| 3-$SCH_2C_6H_5$ | " | " | " | " | " | " |
| 3-$CH_2CH_3$ | " | " | " | " | " | " |
| 3-$SCH_2COOCH_3$ | " | " | " | " | " | " |
| 3-$SCH_2CH_2COOC_2H_5$ | None | " | " | " | " | " |
| 3-$SCH_2CH_2COOCH(CH_3)_2$ | " | " | " | " | " | " |
| 3-$SO_2C_4H_9$—n | " | " | " | " | " | " |
| 3-$SCH_2CH_2CONHC_4H_9$—n | " | " | " | " | " | " |
| 3-$SCH_3$ | 7-$CH_3$ | " | " | " | " | " |
| " | " | " | " | 2-$CH_3$ | " | " |
| 3-$SC_2H_5$ | " | " | " | 2-Cl | " | " |
| " | " | " | " | 2-$OCH_3$ | " | " |
| " | " | " | " | 3-Cl | " | " |
| " | " | " | " | 4-Cl | " | " |
| " | " | " | " | 2,5-di-Cl | " | " |
| " | " | " | " | 3-$OC_2H_5$ | " | " |
| " | " | " | " | 4-$OCH_3$ | " | " |
| " | " | " | " | 4-$SCH_3$ | " | " |
| " | " | " | " | 4-$OCH(CH_3)_2$ | " | " |
| " | " | " | " | 2,5-di-$OCH_3$ | " | $Na^+$ |
| " | " | " | " | 2,5-di-$CH_3$ | " | " |
| " | " | " | " | " | 2 | " |
| " | " | " | " | " | 3 | " |
| " | " | " | " | " | 4 | " |
| " | " | " | " | " | 5 | " |
| " | " | " | " | " | 6 | " |

TABLE 12

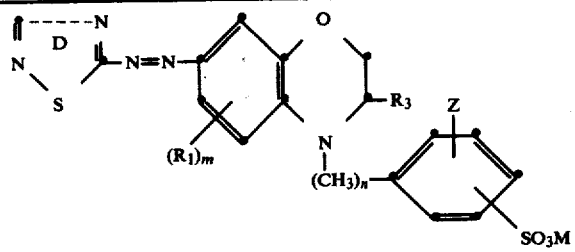

| Substituents on Ring D | $(R_1)_m$ | $R_3$ | Z | n | M |
|---|---|---|---|---|---|
| 3-$CH_3$ | None | H | H | 1 | $Na^+$ |
| " | 6-$CH_3$ | " | " | " | " |
| " | " | 3-$CH_3$ | " | " | " |
| " | 6-$OCH_3$ | " | " | " | " |
| " | " | H | " | " | " |
| 3-Cl | 6-$CH_3$ | 3-$CH_3$ | " | " | " |
| 3-$SCH_3$ | " | " | " | " | " |
| 3-$CH_2CH_3$ | " | " | " | " | " |
| 3-$SCH_2CH_2OCH_3$ | " | " | " | " | " |
| 3-$SCH_2CH_2OC_2H_5$ | " | " | " | " | " |
| 3-$SCH_2CH_2COOCH_3$ | " | " | " | " | " |
| 3-$SCH_2COOCH_2CH_3$ | " | " | " | " | " |
| 3-$SCH_2C_6H_5$ | | | | | |

TABLE 12-continued

[Structure with ring D, azo linkage, and SO3M group]

| Substituents on Ring D | (R₁)ₘ | R₃ | Z | n | M |
|---|---|---|---|---|---|
| 3-SC₆H₁₁ | " | " | " | " | " |
| 3-SCH₃ | 6-NHCOCH₃ | " | " | " | K⁺ |
| " | 6-NHCOC₆H₅ | " | " | " | " |
| " | 6-NHCOC₄H₉—n | " | " | " | " |
| " | 6-NHCONHC₂H₅ | " | " | " | " |
| " | 6-NHCOCH₂OCH₃ | " | " | " | " |
| " | 6-NHCOCH₂CN | " | " | " | " |
| 3-SO₂CH₃ | 6-CH₃ | " | " | " | Na⁺ |
| 3-SO₂C₄H₉—n | " | " | " | " | " |
| 3-C₆H₅ | " | " | " | " | " |
| 3-C₆H₄—o-CN | " | " | " | " | " |
| 3-C₆H₄—o-Cl | " | " | " | " | " |
| 3-C₆H₄—p-CH₃ | " | " | " | " | " |
| 3-C₆H₄—m-CH₃ | " | " | " | " | " |
| 3-C₆H₄—o-CH₃ | " | " | " | " | " |
| 3-C₆H₄—o-CONH₂ | " | " | " | " | " |
| 3-C₆H₄—OCN | 6-NHCHO | " | " | " | " |
| 3-S—CH₂CH₂OC₆H₅ | 6-CH₃ | " | " | " | " |
| 3-SO₂C₄H₉—n | " | " | " | " | " |
| 3-SO₂CH₂CH₂COOCH₃ | " | " | " | " | " |
| 3-SO₂CH₂COOCH₃ | " | " | " | " | " |
| 3-SO₂C₆H₁₁ | " | " | " | " | " |
| 3-SO₂CH₂CH₃ | " | " | " | " | " |
| 3-SO₂CH₂CH₂OCH₃ | " | " | " | " | " |
| 3-SCH₂CH₂CONHC₂H₄OH | " | " | 4-CH₃ | 1 | " |
| 3-SCH₂CH₃ | " | " | 3-CH₃ | " | " |
| " | " | " | 2-Cl | " | " |
| " | " | " | 4-OCH₃ | " | " |
| " | " | " | 2,5-di-Cl | " | " |
| " | " | " | 2,5-di-CH₃ | " | " |
| " | " | " | 2,5-di-OCH₃ | " | " |
| " | " | " | H | 2 | " |
| 3-C₆H₅ | " | " | 2-Cl | " | " |
| " | " | " | 3-Cl | " | " |
| " | " | " | 4-Cl | " | " |
| " | " | " | H | 3 | " |
| " | " | " | " | 4 | " |
| " | " | " | " | 5 | " |
| " | " | " | " | 6 | " |
| " | " | " | 4-OCH₃ | 2 | " |
| " | " | " | 4-CH₃ | " | " |
| " | " | " | 4-Br | " | " |
| " | " | " | 4-I | " | " |
| " | " | " | 4-NHCOCH₃ | " | " |

TABLE 13

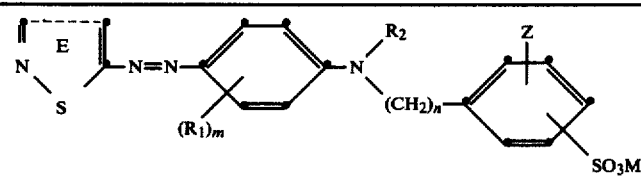

| Substituents on Ring E | (R₁)ₘ | R₂ | Z | n | M |
|---|---|---|---|---|---|
| 3-CH₃—4-Br | None | C₂H₅ | H | 1 | K⁺ |
| " | " | C₆H₁₁ | " | " | " |
| " | " | C₆H₅ | " | " | " |
| " | 3CH₃ | C₂H₅ | " | " | " |
| " | " | CH₂C₆H₅ | " | " | " |
| " | " | CH₂CH₂OCH₃ | " | " | " |
| " | " | CH₂CH₂CONH₂ | " | " | " |

TABLE 13-continued

Structure:
E-ring fused to N=C-S (thiazole), connected via -N=N- to a benzene ring bearing $(R_1)_m$ and $-N(R_2)-(CH_2)_n-$ to a second benzene ring bearing Z and $SO_3M$.

| Substituents on Ring E | $(R_1)_m$ | $R_2$ | Z | n | M |
|---|---|---|---|---|---|
| " | " | $CH_2CH_2Cl$ | " | " | " |
| " | 3-NHCOCH$_3$ | $C_2H_5$ | " | " | " |
| " | 2-CH$_3$—5-NHCOCH$_3$ | H | " | " | " |
| " | 2-OCH$_3$—5-CH$_3$ | " | " | " | " |
| " | 2-Cl | " | " | " | " |
| " | 2-CH$_3$ | " | " | " | " |
| " | 2,5-di-Cl | " | " | " | " |
| " | 2-OCH$_3$—5-Cl | " | " | " | " |
| 3-CH—4-Cl | 2-OCH$_3$—5-CH$_3$ | " | " | " | Na$^+$ |
| " | 2,5-di-CH$_3$ | " | " | " | " |
| " | 3-CH$_3$ | $-CH_2-$(furan-2-yl, via O) | " | " | " |
| " | 3-CH$_3$ | $CH_2CH_2N(COCH_2)(COCH_2)$ (succinimidyl) | " | " | " |
| 3-CH$_3$—4-CN | 3-CH$_3$ | $CH_2CH_2N$(phthalimido) | " | " | NH$_4^+$ |
| 3-CH$_3$—4-COOC$_2$H$_5$ | 3-CH$_3$ | $CH_2CH_2N(CO-CH_2)(CH_2CH_2)$ (glutarimido) | " | " | K$^+$ |
| " | 3-CH$_3$ | $CH_2CH_2NHSO_2CH_3$ | " | " | " |
| " | 3-CH$_3$ | $CH_2CH_2CH_2NHCOCH_3$ | " | " | " |
| " | None | $CH_3$ | " | " | " |
| 3-CH$_3$—4-SCH$_2$CH=CH$_2$ | 3-CH$_3$ | $CH_2CH(CH_3)_2$ | " | " | " |
| " | " | $CH_2C_6H_{11}$ | " | " | " |
| " | " | $CH_2CH_2OC_6H_5$ | " | " | " |
| 3-CH$_3$—4-SO$_2$C$_2$H$_5$ | " | $CH(CH_3)_2$ | " | " | " |
| 3-CH$_3$—4-SC$_6$H$_{11}$ | H | $-CH_2CH_3$ | " | " | K$^+$ |
| 3-CH$_3$—4-OC$_2$H$_5$ | " | $CH_2CH_2OCH_2CH_2OC_2H_5$ | " | " | " |
| 3-Cl—4-CN | 3-CH$_3$ | " | " | " | " |
| 3-CH$_3$—4-SCN | " | " | " | " | " |
| 3-Br—4-COOCH$_3$ | " | " | " | " | " |
| 3-CH$_3$—4-COOC$_2$H$_5$ | " | " | " | " | " |
| 3-CH$_3$—4-CONH$_2$ | 3-NHCOC$_6$H$_5$ | " | " | " | " |
| 3-CH$_3$—4-CONHC$_2$H$_4$OH | 3-NHCONHC$_2$H$_5$ | " | " | " | " |
| 3-CH$_3$—4-CONHC$_4$H$_9$—n | 3-NHCOCH$_2$OCH$_3$ | " | " | " | " |
| 3-CH$_3$—4-OC$_6$H$_5$ | 3-NHCOC$_6$H$_{11}$ | " | 2-CH$_3$ | " | " |
| 3-CH$_3$—4-OC$_6$H$_4$—p-CH$_3$ | 3-NHCOOC$_2$H$_5$ | " | 3-Cl | " | " |
| 3-CH$_3$—4-SC$_6$H$_5$ | 3-NHCOCH$_2$CN | " | 4-OCH$_3$ | " | " |
| 3-CH$_3$—4-SCH$_2$CH$_2$OH | " | " | 2,5-di-Cl | " | " |
| 3-CH$_3$—4-SCH$_2$CH$_3$ | None | " | 2,5-di-OCH$_3$ | " | " |
| 3-CH$_3$—4-S—C(benzothiazole) | " | " | " | " | " |
| 3-CH$_3$—4-Br | 3-CH$_3$ | " | H | 2 | " |
| " | " | " | " | 3 | " |
| " | " | " | " | 4 | " |

TABLE 13-continued

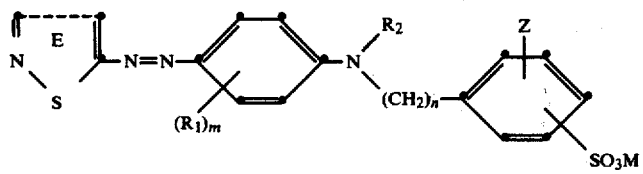

| Substituents on Ring E | $(R_1)_m$ | $R_2$ | Z | n | M |
|---|---|---|---|---|---|
| " | " | " | " | 5 | " |
| " | " | " | " | 6 | " |
| 3-CH$_3$—4-CONH$_2$ | " | " | " | " | " |

TABLE 14

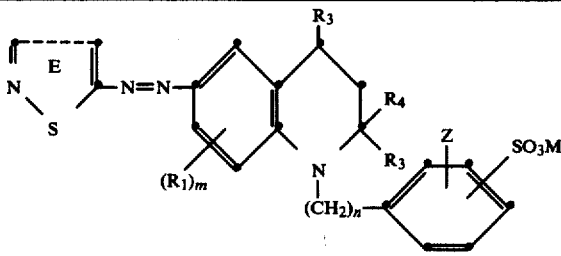

| Substituents on Ring E | $(R_1)_m$ | $R_3$ | $R_4$ | Z | n | M |
|---|---|---|---|---|---|---|
| 3-CH$_3$—4-Br | None | CH$_3$ | CH$_3$ | H | 1 | K$^+$ |
| " | " | H | CH$_3$ | " | " | " |
| " | 7-CH$_3$ | " | " | " | " | " |
| " | " | CH$_3$ | " | " | " | " |
| " | 7-CH$_3$ | H | CH(CH$_3$)$_2$ | " | " | " |
| " | 7-OCH$_3$ | " | CH$_3$ | " | " | " |
| " | 5-OCH$_3$, 8-CH$_3$ | " | " | " | " | " |
| " | 5,8-di-OCH$_3$ | " | " | " | " | " |
| " | 5,8-di-CH$_3$ | " | " | " | " | " |
| " | 7-Cl | " | " | " | " | " |
| " | 5,8-di-Cl | " | " | " | " | " |
| 3-CH$_3$—4-CN | None | " | " | " | " | Na$^+$ |
| " | 5-OCH$_3$, 8-CH$_3$ | CH$_3$ | " | " | " | " |
| " | 7-NHCHO | " | " | " | " | " |
| 3-CH$_3$—4-COOC$_2$H$_5$ | 7-NHCOCH | " | " | " | " | " |
| " | 7-NHCOCH$_2$OCH$_3$ | " | " | " | " | " |
| " | 7-NHCOOC$_2$H$_5$ | " | " | " | " | " |
| 3-CH$_3$ | 7-NHCOC$_6$H$_5$ | " | " | " | " | " |
| " | 7-NHCONHC$_2$H$_5$ | " | " | " | " | K$^+$ |
| 3-CH$_3$—4-Cl | 7-NHCOC$_6$H$_{11}$ | " | " | " | " | " |
| " | None | " | " | " | " | " |
| " | 7-CH$_3$ | H | " | " | " | " |
| " | " | " | H | " | " | " |
| 3-Cl—4-CN | " | " | CH$_3$ | " | " | " |
| 3-Br—4-COOCH$_3$ | " | " | " | " | " | " |
| 3-CH$_3$—4-COOCH$_3$ | " | " | " | " | " | " |
| 3-CH$_3$—4-CONH$_2$ | " | " | " | " | " | " |
| 3-CH$_3$—4-CONHC$_2$H$_4$OH | " | " | " | " | " | " |
| 3-CH$_3$—4-CONHC$_4$H$_9$—n | 7-OCH$_3$ | " | " | " | " | " |
| 3-CH$_3$—4-CONHC$_3$H$_6$OCH$_3$ | 7-CH$_3$ | " | " | " | " | " |
| 3-CH$_3$—4-COOC$_2$H$_4$OCH$_3$ | " | " | " | " | " | " |
| 3-CH$_3$—4-SCH$_2$CH$_2$OH | " | " | " | " | " | " |
| 3-CH$_3$—4-SCH$_2$CH$_2$OCOCH$_3$ | " | " | " | " | " | " |
| 3-CH$_3$—4-SCH$_3$ | " | " | " | " | " | " |
| 3-CH$_3$—4-SO$_2$CH$_3$ | " | " | " | " | " | " |
| 3-CH$_3$—4-SC$_6$H$_5$ | None | " | " | " | " | " |
| 3-CH$_3$—4-SC$_6$H$_4$—p-C(CH$_3$)$_3$ | " | " | " | 2-CH$_3$ | " | " |
| 3-CH$_3$—4-SC$_6$H$_4$—p-Cl | " | " | " | 3-CH$_3$ | " | " |
| " | " | " | " | 4-Cl | " | " |

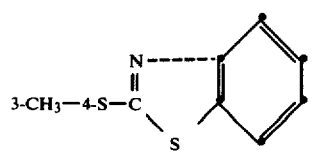

3-CH$_3$—4-S

TABLE 14-continued

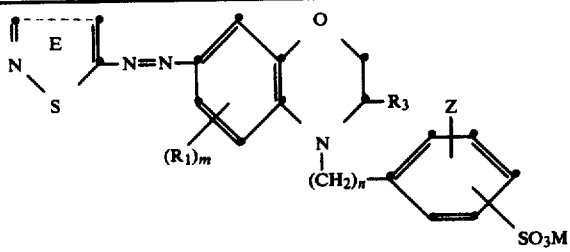

| Substituents on Ring E | (R₁)ₘ | R₃ | R₄ | Z | n | M |
|---|---|---|---|---|---|---|
| | 7-CH₃ | " | " | 4-OCH₃ | " | " |
| 3-CH₃—4-S—[oxazole-phenyl] | " | " | " | 2,5-di-CH₃ | " | " |
| 3-CH₃—4-S—[cyanamino-thiadiazole] | " | " | " | " | " | " |
| 3-CH₃—4-SC₆H₁₁ | " | " | " | 2,5-di-Cl | " | " |
| 3-CH₃—4-SCN | " | " | " | 4-OC₂H₅ | " | " |
| 3-CH₃—4-OC₆H₅ | " | " | " | 2-Cl | " | " |
| 3-CH₃—4-OC₂H₅ | " | " | " | 4-Br | " | " |
| 3-CH₃—4-SCH₂CH=CH₂ | " | " | " | 4-I | " | " |
| 3-CH₃—4-Br | " | " | " | 4-CH₃ | " | " |
| " | " | " | " | H | 2 | " |
| " | " | " | " | " | 3 | " |
| " | " | " | " | " | 4 | " |
| " | " | " | " | " | 5 | Na⁺ |
| " | " | " | " | " | 6 | " |

TABLE 15

| Substituents on Ring E | (R₁)ₘ | R₃ | Z | n | M |
|---|---|---|---|---|---|
| 3-CH₃—4-Cl | None | H | " | " | Na⁺ |
| " | 6-CH₃ | " | " | " | " |
| " | " | 3-CH₃ | " | " | " |
| " | 6-OCH₃ | " | " | " | " |
| 3-Cl—4-CN | " | H | " | " | " |
| " | 6-CH₃ | 3-CH₃ | " | " | " |
| 3-CH₃ | " | " | " | " | " |
| 3-CH₃—4-COOC₂H₅ | " | " | " | " | " |
| 3-CH₃—4-CONH₂ | " | " | " | " | " |
| 3-CH₃—4-CONHC₂H₄OH | " | " | " | " | " |
| 3-CH₃—4-CONHC₄H₉—n | " | " | " | " | " |
| 3-CH₃—4-CONHC₃H₆OCH₃ | " | " | " | " | " |
| 3-CH₃—4-CO₂CH₂CH₂OCH₃ | " | " | " | " | " |
| 3-CH₃—4-CONHCH₃ | " | " | " | " | K⁺ |
| 3-CH₃—4-Br | 6-NHCOCH | " | " | " | " |
| " | 6-NHCOC₆H₅ | " | " | " | " |
| " | 6-NHCOC₄H₉—n | " | " | " | " |
| " | 6-NHCONHC₂H₅ | " | " | " | " |
| " | 6-NHCOCH₂OCH₃ | " | " | " | " |
| " | 6-NHCOCH₂CN | " | " | " | " |
| 3-CH₃—4-SC₂H₅ | 6-CH₃ | " | " | " | Na⁺ |
| 3-CH₃—4-SCH₂CH₂OH | " | " | " | " | " |

TABLE 15-continued

[Structure: thiazole ring E attached via N=N to benzene ring with (R₁)ₘ, connected through O-CH(R₃)- to N((CH₂)ₙ-aryl-SO₃M)]

| Substituents on Ring E | (R₁)ₘ | R₃ | Z | n | M |
|---|---|---|---|---|---|
| 3-CH₃—4-SCH₂CH=CH₂ | " | " | " | " | " |
| 3-CH₃—4-S—CH₂CH₂OCOCH₃ | " | " | " | " | " |
| 3-CH₃—4-S—C₆H₅ | " | " | " | " | " |
| 3-CH₃—4-S—C₆H₄—p-C(CH₃)₂ | " | " | " | " | " |
| 3-CH₃—4-S—C₆H₁₁ | " | " | " | " | " |
| 3-CH₃—4-SO₂CH₂CH₂OH | " | " | " | " | " |
| 3-CH₃—4-SO₂CH₂CH₃ | " | " | " | " | " |
| 3-CH₃—4-OC₆H₅ | 6-NHCHO | " | " | " | " |
| 3-CH₃—4-OC₆H₄—p-OCH₃ | 6-CH₃ | " | " | " | " |
| [3-CH₃-4-S-benzothiazole structure] | " | " | " | " | " |
| [3-CH₃-4-S-thiadiazole-NHCOCH₃ structure] | " | " | " | " | " |
| [3-CH₃-4-S-triazole structure] | " | " | " | " | " |
| 3-CH₃—4-SCH₂CH(OH)CH₂OH | " | " | " | " | " |
| 3-CH₃—4-SCH₂COOCH₃ | " | " | " | " | " |
| 3-CH₃—4-OC₂H₅ | " | " | " | " | " |
| 3-CH₃—4-Br | " | " | " | 2 | " |
| " | " | " | " | 3 | " |
| " | " | " | " | 4 | " |
| " | " | " | " | 5 | " |
| " | " | " | " | 6 | " |
| " | " | " | 2-CH₃ | 6 | " |
| " | " | " | 3-CH₃ | 6 | " |
| " | " | " | 4-CH₃ | 6 | " |
| " | " | " | 4-Cl | 1 | " |
| " | " | " | 3,4-di-Cl | " | " |
| " | " | " | 2,5-di-OCH₃ | " | " |
| " | " | " | 2,5-di-CH₃ | " | " |
| " | " | " | 4-OCH₃ | " | " |
| " | " | " | 4-SCH₃ | " | " |
| " | " | " | 4-OC₂H₅ | " | " |
| " | " | " | 4-Br | " | " |
| " | " | " | 4-I | " | " |

TABLE 16

[Structure: pyrazole ring F with N-A, attached via N=N to benzene ring with (R₁)ₘ, connected through N(R₂)-(CH₂)ₙ-aryl-SO₃M]

| A | Substituents on Ring F | (R₁)ₘ | R₂ | Z | n | M |
|---|---|---|---|---|---|---|
| H | 4-CN | None | C₂H₅ | H | 1 | K⁺ |

TABLE 16-continued

Structure: A-N(H)-N=C(F)-... pyrazolone-type with NH-N=N linkage to ring bearing (R₁)ₘ, then N(R₂)-(CH₂)ₙ-phenyl with Z substituent and SO₃M group.

| A | Substituents on Ring F | (R₁)ₘ | R₂ | Z | n | M |
|---|---|---|---|---|---|---|
| " | " | " | C₆H₁₁ | " | " | " |
| " | " | " | C₆H₅ | " | " | " |
| " | " | 3-CH₃ | C₂H₅ | " | " | " |
| " | " | " | CH₂C₆H₅ | " | " | " |
| " | " | " | CH₂CH₂OCH₃ | " | " | " |
| " | " | " | CH₂CH₂CONH₂ | " | " | " |
| " | " | " | CH₂CH₂Cl | " | " | " |
| " | " | 3-NHCOCH₃ | C₂H₅ | " | " | " |
| " | " | 2-CH₃—5-NHCOCH₃ | H | " | " | " |
| " | " | 2-OCH₃—5-CH₃ | " | " | " | " |
| " | " | 2-Cl | " | " | " | " |
| " | " | 2-CH₃ | " | " | " | " |
| " | " | 2,5-di-Cl | " | " | " | " |
| " | " | 2-OCH₃—5-Cl | " | " | " | " |
| " | " | 2-OC₂H₅—5-CH₃ | " | " | " | " |
| C₆H₅ | 3-SC₂H₅—4-CN | 2,5-di-CH₃ | " | " | " | Na⁺ |
| " | 3-SC₂H₅—4-COOCH₃ | 3-CH₃ | —CH₂-(furan-2-yl) (CH₂ attached to furan ring with O) | " | " | " |
| " | 3-SC₂H₅—4-CONH₂ | 3-CH₃ | CH₂CH₂N(COCH₂)(COCH₂) (succinimide-type ring) | " | " | " |
| " | 3-SCH₃—4-CN | 3-CH₃ | CH₂CH₂N(phthalimide) | " | " | NH₄⁺ |
| " | " | 3-CH₃ | CH₂CH₂N(CO—CH₂)(CH₂—CH₂) (pyrrolidinone-type) | " | " | K⁺ |
| " | " | 3-CH₃ | CH₂CH₂NHSO₂CH₃ | " | " | " |
| " | " | 3-CH₃ | CH₂CH₂CH₂NHCOCH₃ | " | " | " |
| SO₂C₆H₅ | " | None | CH₃ | " | " | " |
| COCH₃ | 4-CN | 3-CH₃ | CH₂CH(CH₃)₂ | " | " | " |
| H | " | " | CH₂C₆H₁₁ | " | " | " |
| " | " | " | CH₂CH₂OC₆H₅ | " | " | " |
| " | " | " | CH(CH₃)₂ | " | " | " |
| COOC₂H₅ | " | H | —CH₂CH₃ | " | " | K⁺ |
| H | " | " | CH₂CH₂OCH₂CH₂OC₂H₅ | " | " | " |
| CH₃ | 4-CN | 3-CH₃ | —CH₂CH₃ | " | " | " |
| " | 4-COOCH₃ | " | " | " | " | " |
| " | 4-CONH₂ | " | " | " | " | " |
| —CH₂CH₃ | 4-CN | " | " | " | " | " |
| C₂H₅ | " | 3-NHCOC₆H₅ | " | " | " | " |
| " | 4-COOCH₃ | 3-NHCONHC₂H₅ | " | " | " | " |
| C₆H₄—p-Cl | " | 3-NHCOCH₂OCH₃ | " | " | " | " |
| C₆H₄—o-CH₃ | " | 3-NHCOC₆H₁₁ | " | " | " | " |
| C₆H₅ | " | 3-NHCOOC₂H₅ | " | " | " | " |
| " | " | 3-NHCOCH₂CN | " | " | " | " |
| H | 4-CONHC₂H₄OH | " | " | " | " | " |
| " | 4-CONHC₄H₉—n | None | " | " | " | " |
| " | 4-COOC₂H₄OCH₃ | " | " | " | " | " |
| " | 4-CONHC₃H₆OCH₃ | 3-CH₃ | " | " | " | " |
| " | 4-CN | " | " | 2-CH₃ | " | " |
| " | " | " | " | 3-CH₃ | " | " |
| " | " | " | " | 4-CH₃ | " | " |
| " | " | " | " | 4-Cl | 2 | " |

TABLE 16-continued

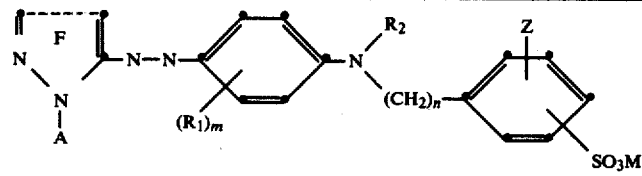

| A | Substituents on Ring F | $(R_1)_m$ | $R_2$ | Z | n | M |
|---|---|---|---|---|---|---|
| $SO_2CH_3$ | 4-CN | " | " | 2-Cl | 3 | " |
| $SO_2C_6H_5$ | " | " | " | 2,5-di-Cl | 4 | " |
| $SO_2CH_2CH_3$ | " | " | " | 2,5-di-$CH_3$ | 5 | " |
| H | " | " | " | 4-$OCH_3$ | 6 | " |

TABLE 17

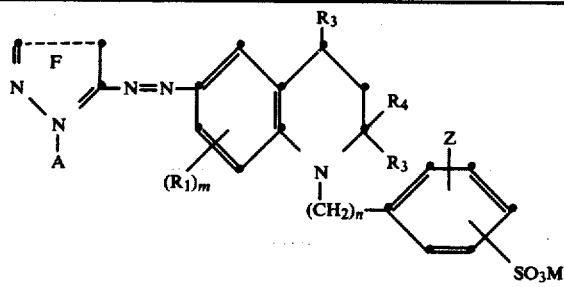

| A | Substituents on Ring F | $(R_1)_m$ | $R_3$ | $R_4$ | Z | n | M |
|---|---|---|---|---|---|---|---|
| H | 4-CN | None | $CH_3$ | $CH_3$ | H | 1 | $K^+$ |
| " | " | " | H | $CH_3$ | " | " | " |
| " | " | 7-$CH_3$ | " | " | " | " | " |
| " | " | " | $CH_3$ | " | " | " | " |
| " | " | 7-$CH_3$ | H | $CH(CH_3)_2$ | " | " | " |
| " | " | 7-$OCH_3$ | " | $CH_3$ | " | " | " |
| " | " | 5-$OCH_3$, 8-$CH_3$ | " | " | " | " | " |
| " | " | 5,8-di-$OCH_3$ | " | " | " | " | " |
| " | " | 5,8-di-$CH_3$ | " | " | " | " | " |
| " | " | 7-Cl | " | " | " | " | " |
| " | " | 5,8-di-Cl | " | " | " | " | " |
| $CH_3$ | " | None | " | " | " | " | $Na^+$ |
| " | " | 5-$OCH_3$, 8-$CH_3$ | $CH_3$ | " | " | " | " |
| H | 4-$COOCH_3$ | 7-NHCHO | " | " | " | " | " |
| H | 4-$COOC_2H_5$ | 7-$NHCOCH_3$ | " | " | " | " | " |
| H | 4-$COOC_2H_4OCH_3$ | 7-$NHCOCH_2OCH_3$ | " | " | " | " | " |
| H | 4-$CONH_2$ | 7-$NHCOOC_2H_5$ | " | " | " | " | " |
| H | 4-$CONHC_2H_5$ | 7-$NHCOC_6H_5$ | " | " | " | " | " |
| " | " | 7-$NHCONHC_2H_5$ | " | " | " | " | $K^+$ |
| " | " | 7-$NHCOC_6H_{11}$ | " | " | " | " | " |
| $C_6H_5$ | 4-CN | None | " | " | " | " | " |
| " | " | 7-$CH_3$ | H | " | " | " | " |
| $C_6H_4$—p-Cl | " | " | " | H | " | " | " |
| $C_6H_4$—p-$CH_3$ | " | " | " | CH | " | " | " |
| $SO_2CH_3$ | " | " | " | " | " | " | " |
| " | 4-$COOCH_3$ | " | " | " | " | " | " |
| $SO_2C_6H_5$ | " | " | " | " | " | " | " |
| " | 4-CN | " | " | " | " | " | " |
| " | 4-$CONHC_2H_4OH$ | 7-$OCH_3$ | " | " | " | " | " |
| " | 4-$COOCH(CH_3)_2$ | 7-$CH_3$ | " | " | " | " | " |
| $CH_3$ | 3-$SC_2H_5$-4-CN | " | " | " | " | " | " |
| $C_6H_5$ | " | " | " | " | " | " | " |
| " | 3-$SC_2H_5$—4-$COOCH_3$ | " | " | " | " | " | " |
| " | 3-$SCH_3$—4-$COOC_2H_5$ | " | " | " | " | " | " |
| " | 3-$SO_2CH_3$—4-$COOCH_3$ | " | " | " | " | " | " |
| " | 3-$SC_6H_5$—4-$COOCH_3$ | None | " | " | " | " | " |
| $COCH_3$ | 4-CN | " | " | " | " | " | " |
| " | 4-$COOCH_3$ | " | " | " | " | " | " |
| $CH_2CH_2OH$ | " | " | " | " | " | " | " |
| H | 3-$CH_2CN$—4-CN | 7-$CH_3$ | " | " | " | 2 | " |
| H | 3-$CH_2CONH_2$—4-CN | " | " | " | " | " | " |
| H | 4-CN | " | " | " | " | " | " |
| " | 41 | " | " | " | " | 1 | " |
| " | " | " | " | " | 2-$CH_3$ | " | " |
| " | " | " | " | " | 3-Cl | " | " |
| " | " | " | " | " | 3-$CH_3$ | " | " |

TABLE 17-continued

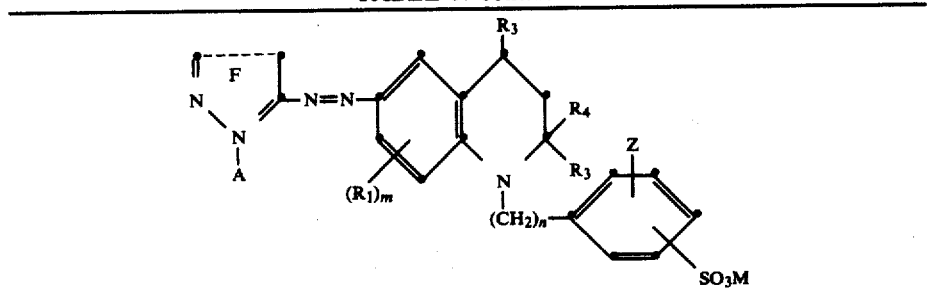

| A | Substituents on Ring F | $(R_1)_m$ | $R_3$ | $R_4$ | Z | n | M |
|---|---|---|---|---|---|---|---|
| " | " | " | " | " | 4-OCH$_3$ | " | " |
| " | " | " | " | " | 4-OC$_4$H$_9$—n | " | " |
| " | " | " | " | " | 2,5-di-Cl | " | " |
| " | " | " | " | " | 2,5-di-CH$_3$ | " | " |
| " | " | " | " | " | 4-Br | " | Na$^+$ |
| " | " | " | " | " | 4-I | " | " |
| " | " | " | " | " | H | 2 | " |
| " | " | " | " | " | " | 3 | " |
| " | " | " | " | " | " | 4 | " |
| " | " | " | " | " | " | 5 | " |
| " | " | " | " | " | " | 6 | " |

TABLE 18

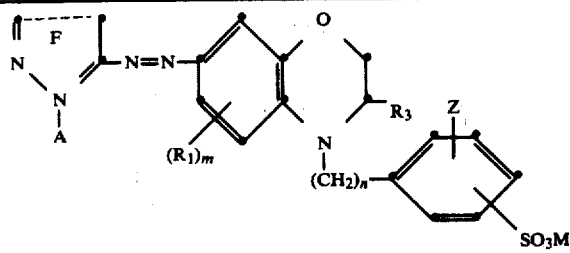

| A | Substituents on Ring F | $(R_1)_m$ | $R_3$ | Z | n | M |
|---|---|---|---|---|---|---|
| H | 4-CN | None | H | H | 1 | Na$^+$ |
| " | " | 6-CH$_3$ | " | " | " | " |
| CH$_3$ | " | " | 3-CH$_3$ | " | " | " |
| " | 4-COOCH$_3$ | 6-OCH$_3$ | " | " | " | " |
| " | 4-COOC$_2$H$_4$OC$_2$H$_5$ | " | H | " | " | " |
| " | 4-CONH$_2$ | 6-CH$_3$ | 3-CH$_3$ | " | " | " |
| " | 4-CONHC$_2$H$_4$OH | " | " | " | " | " |
| " | 4-CONHC$_3$H$_6$OCH$_3$ | " | " | " | " | " |
| " | 4-CONHC$_2$H$_4$NHCOCH$_3$ | " | " | " | " | " |
| —CH$_2$CH$_3$ | 4-CN | " | " | " | " | " |
| C$_6$H$_5$ | " | " | " | " | " | " |
| " | 4-COOCH$_2$CH$_3$ | " | " | " | " | " |
| " | 4-CONH$_2$ | " | " | " | " | " |
| C$_6$H$_4$—o-Cl | " | " | " | " | " | " |
| H | " | 6-NHCOCH$_3$ | " | " | " | " |
| " | 4-COOCH$_3$ | 6-NHCOC$_6$H$_5$ | " | " | " | " |
| " | " | 6-NHCOC$_4$H$_9$—n | " | " | " | " |
| " | 4-CONHC$_4$H$_9$—n | 6-NHCONHC$_2$H$_5$ | " | " | " | " |
| " | " | 6-NHCOCH$_2$OCH$_3$ | " | " | " | " |
| " | " | 6-NHCOCH$_2$CN | " | " | " | " |
| SO$_2$CH$_3$ | 4-CN | 6-CH | " | " | " | Na$^+$ |
| " | 4-COOCH$_3$ | " | " | " | " | " |
| H | 3-CH$_2$CN—4-CN | " | " | " | " | " |
| C$_6$H$_5$ | 3-SCH$_3$—4-CN | " | " | " | " | " |
| " | 3-SCH$_2$CH$_3$—4-CN | " | " | " | " | " |
| " | 3-SCH$_2$CH$_3$—4-COOCH$_3$ | " | " | " | " | " |
| " | 3-SCH$_3$—4-CONHC$_4$H$_9$-n | " | " | " | " | " |
| SO$_2$C$_6$H$_5$ | 4-CN | " | " | " | " | " |
| " | 4-COOCH$_3$ | " | " | " | " | " |
| SO$_2$C$_6$H$_4$—p-CH$_3$ | 4-CN | 6-NHCHO | " | " | " | " |
| SO$_2$C$_4$H$_9$—n | " | 6-CH$_3$ | " | " | " | " |
| COCH$_3$ | " | " | " | " | " | " |
| COOC$_2$H$_5$ | " | " | " | " | " | " |
| CH$_2$CH$_2$OH | " | " | " | " | " | " |
| C$_6$H$_4$—O-CH$_3$ | " | " | " | " | " | " |

TABLE 18-continued

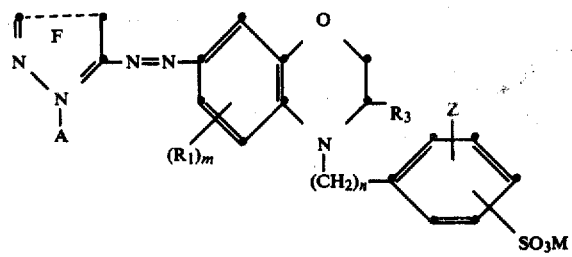

| A | Substituents on Ring F | $(R_1)_m$ | $R_3$ | Z | n | M |
|---|---|---|---|---|---|---|
| " | 4-COOCH$_3$ | " | " | " | " | " |
| " | 4-COOCH(CH$_3$)$_2$ | " | " | " | " | " |
| SO$_2$C$_6$H$_{11}$ | " | " | " | " | " | " |
| H | 4-CN | " | " | " | " | " |
| " | " | " | " | " | 2 | " |
| " | " | " | " | " | 3 | " |
| " | " | " | " | " | 4 | " |
| " | " | " | " | " | 5 | " |
| " | " | " | " | " | 6 | " |
| " | " | " | " | 2-CH$_3$ | 1 | " |
| C$_6$H$_5$ | " | " | " | 2-Cl | " | " |
| " | " | " | " | 2-OCH$_3$ | | |
| " | " | " | " | 4-OCH$_3$ | " | " |
| " | " | " | " | 4-Cl | " | " |
| " | " | " | " | 4-CH$_3$ | " | " |
| " | " | " | " | 4-Cl | 2 | " |
| " | " | " | " | " | 3 | " |
| " | " | " | " | " | 4 | " |
| " | " | " | " | " | 5 | " |
| " | " | " | " | " | 6 | " |
| " | " | " | " | 2,5-di-Cl | " | " |
| " | " | " | " | 2,5-di-CH$_3$ | " | " |

TABLE 19

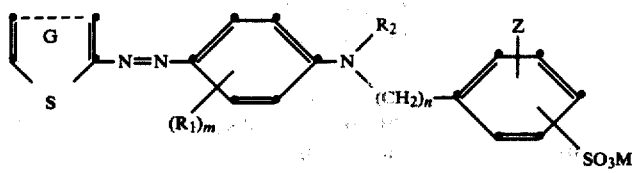

| Substituents on Ring G | $(R_1)_m$ | $R_2$ | Z | n | M |
|---|---|---|---|---|---|
| 3,5-di-CN—4-CH$_3$ | None | C$_2$H$_5$ | H | 1 | K$^+$ |
| " | " | C$_6$H$_{11}$ | " | " | " |
| " | " | C$_6$H$_5$ | " | " | " |
| " | 3-CH$_3$ | C$_2$H$_5$ | " | " | " |
| 3-CN—5-C$_6$H$_5$ | " | CH$_2$C$_6$H$_5$ | " | " | " |
| 3-COOCH$_3$—5-C$_6$H$_5$ | " | CH$_2$CH$_2$OCH$_3$ | " | " | " |
| 3-CONH$_2$—5-C$_6$H$_5$ | " | CH$_2$CH$_2$CONH$_2$ | " | " | " |
| 3-CONHC$_2$H$_5$—5-C$_6$H$_5$ | " | CH$_2$CH$_2$Cl | " | " | " |
| 3-COOCH$_3$ | 3-NHCOCH$_3$ | C$_2$H$_5$ | " | " | " |
| 3-CN | 2-CH$_3$—5-NHCOCH$_3$ | H | " | " | " |
| 3-CN—4-CH$_3$—5-COOC$_2$H$_5$ | 2-OCH$_3$—5-CH$_3$ | " | " | " | " |
| " | 2-Cl | " | " | " | " |
| " | 2-CH$_3$ | " | " | " | " |
| " | 2,5-di-Cl | " | " | " | " |
| 3-CN—4-CH$_3$—5-COCH$_3$ | 2-OCH$_3$—5-Cl | " | " | " | " |
| 3-COOCH$_3$—4-CH$_3$—5-CN | 2-OCH$_3$—5-CH$_3$ | " | " | " | " |
| 3-COOCH$_3$—4-CH$_3$—5-COC$_6$H$_5$ | 2,5-di-CH$_3$ | " | " | " | Na$^+$ |
| 3-COOCH$_3$—5-COC$_6$H$_5$ | 3-CH$_3$ | | 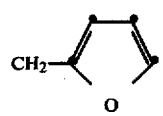 | " | " |

TABLE 19-continued

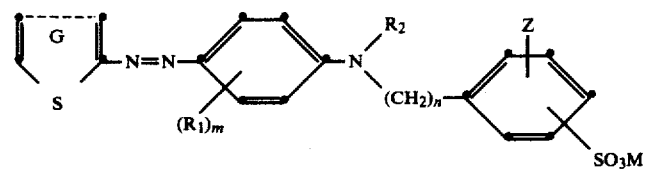

| Substituents on Ring G | $(R_1)_m$ | $R_2$ | Z | n | M |
|---|---|---|---|---|---|
| 3-COOCH$_3$—5-COCH(CH$_3$)$_2$ | 3-CH$_3$ | CH$_2$CH$_2$N(COCH$_2$)(COCH$_2$) | " | " | " |
| " | 3-CH$_3$ | CH$_2$CH$_2$N(CO)(CO)-benzo | " | " | NH$_4^+$ |
| " | 3-CH$_3$ | CH$_2$CH$_2$N(CO—CH$_2$)(CH$_2$CH$_2$) | " | " | K$^+$ |
| " | 3-CH$_3$ | CH$_2$CH$_2$NHSO$_2$CH$_3$ | " | " | " |
| " | 3-CH$_3$ | CH$_2$CH$_2$CH$_2$NHCOCH$_3$ | " | " | " |
| " | None | CH$_3$ | " | " | " |
| 3-SO$_2$C$_6$H$_5$—5-COCH | 3-CH$_3$ | CH$_2$CH(CH$_3$)$_2$ | " | " | " |
| 3-SO$_2$CH$_3$—5-CN | " | CH$_2$C$_6$H$_{11}$ | " | " | " |
| 3-SO$_2$C$_6$H$_5$—5-Br | " | CH$_2$CH$_2$OC$_6$H$_5$ | " | " | " |
| 3,5-di-SO$_2$CH$_3$ | " | CH(CH$_3$)$_2$ | " | " | " |
| 3,5-di-SO$_2$NH$_2$ | H | —CH$_2$CH$_3$ | " | " | K$^+$ |
| 3,5-di-SO$_2$N(C$_2$H$_5$)$_2$ | " | CH$_2$CH$_2$OCH$_2$CH$_2$OC$_2$H$_5$ | " | " | " |
| 3-CN—5-COCH$_3$ | 3-CH$_3$ | Ab,4 CH$_2$CH$_3$ | " | " | " |
| 3-CN—5-COOC(CH$_3$)$_2$ | " | " | " | " | " |
| 3-CN—5-COOC$_2$H$_5$ | " | " | " | " | " |
| 3-CONH$_2$—5-COOC$_2$H$_5$ | " | " | " | " | " |
| 3-CONH$_2$—5-COCH(CH$_3$)$_2$ | 3-NHCOC$_6$H$_5$ | " | " | " | " |
| 3-CONHC$_2$H$_4$OH—5-COCH(CH$_3$)$_2$ | 3-NHCONHC$_2$H$_5$ | " | " | " | " |
| " | 3-NHCOCH$_2$OCH$_3$ | " | " | " | " |
| " | 3-NHCOC$_6$H$_{11}$ | " | " | " | " |
| " | 3-NHCOOC$_2$H$_5$ | " | " | " | " |
| " | 3-NHCOCH$_2$CN | " | " | " | " |
| 3-CONHC$_3$H$_6$OCH$_3$—5-COCH(CH$_3$)$_2$ | " | " | 2-CH$_3$ | " | " |
| 3-CONHC$_4$H$_9$—n-5-COCH(CH$_3$)$_2$ | None | " | 2-Cl | " | " |
| 3-CONHC$_2$H$_4$OH—5-COCH(CH$_3$)$_2$ | " | " | 4-OCH$_3$ | " | " |
| 3-COOCH$_3$—5-SO$_2$CH$_3$ | 3-CH$_3$ | " | 2,5-di-Cl | " | " |
| 3-CONHC$_2$H$_5$—5-SO$_2$CH$_3$ | " | " | 2,5-di-CH$_3$ | " | " |
| 3-CONH$_2$—5-SO$_2$CH$_3$ | " | " | 4-Cl | " | " |
| 3-CONH$_2$—5-SO$_2$C$_4$H$_9$-n | " | " | 4-Br | " | " |
| 3-COOCH$_3$—4-CH$_3$—5-SCN | " | " | H | 2 | " |
| 3-CHO—4-CH$_3$ | " | " | " | 3 | " |
| 3-CONH$_2$—5-C$_6$H$_4$—p-CH$_3$ | " | " | " | 4 | " |
| 3-CN—5-COOC$_2$H$_5$ | " | " | " | 5 | " |
| 3-COOCH$_3$—5-COCH(CH$_3$)$_2$ | " | " | " | 6 | " |

TABLE 20

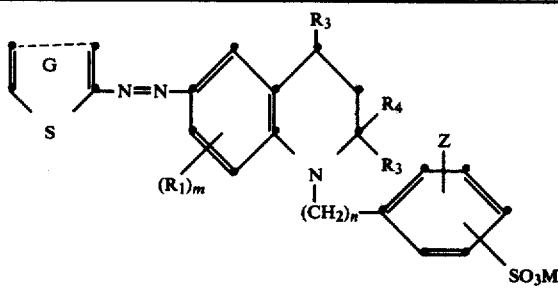

| Substituents on Ring G | (R₁)ₘ | R₃ | R₄ | Z | n | M |
|---|---|---|---|---|---|---|
| 3-CONHC₂H₅—5-COCH(CH₃)₂ | None | CH₃ | CH₃ | H | 1 | K⁺ |
| " | "H | CH₃ | " | " | " | " |
| 3-CONH₂—5-COCH(CH₃)₂ | 7-CH₃ | " | " | " | " | " |
| " | " | CH₃ | " | " | " | " |
| " | 7-CH₃ | H | CH(CH₃)₂ | " | " | " |
| " | 7-OCH₃ | " | CH₃ | " | " | " |
| " | 5-OCH₃, 8-CH₃ | " | " | " | " | " |
| " | 5,8-di-OCH₃ | " | " | " | " | " |
| " | 5,8-di-CH₃ | " | " | " | " | " |
| " | 7-Cl | " | " | " | " | " |
| " | 5,8-di-Cl | " | " | " | " | " |
| 3-COOCH₃—5-COCH(CH₃)₂ | None | " | " | " | " | Na⁺ |
| " | 5-OCH₃, 8-CH₃ | CH₃ | " | " | " | " |
| " | 7-NHCHO | " | " | " | " | " |
| " | 7-NHCOCH₃ | " | " | " | " | " |
| " | 7-NHCOCH₂OCH₃ | " | " | " | " | " |
| 3,5-di-CN—4-CH₃ | 7-NHCOOC₂H₅ | " | " | " | " | " |
| " | 7-NHCOC₆H₅ | " | " | " | " | " |
| " | 7-NHCONHC₂H₅ | " | " | " | " | K⁺ |
| " | 7-NHCOC₆H₁₁ | " | " | " | " | " |
| " | None | " | " | " | " | " |
| 3-CONH₂—5-C₆H₅ | 7-CH₃ | H | " | " | " | " |
| " | " | " | H | " | " | " |
| 3-COOCH₃—5-C₆H₅ | " | " | CH₃ | " | " | " |
| 3-COOCH₃—5-COCH₃ | " | " | " | " | " | " |
| 3-CN—5-COOC₂H₅ | " | " | " | " | " | " |
| 3-CN—4-CH₃—5-COOC₂H₅ | " | " | " | " | " | " |
| 3-CN—4-CH₃—5-COCH₃ | " | " | " | " | " | " |
| 3-COOCH₃—4-CH₃—5-CN | 7-OCH₃ | " | " | " | " | " |
| 3-CN—4-CH₃—5-CO₂CH₂CH₂OC₂H₅ | 7-CH₃ | " | " | " | " | " |
| 3-SO₂C₆H₅—5-COCH₃ | " | " | " | " | " | " |
| 3-SO₂C₆H₄—p-Cl—5-COCH₃ | " | " | " | " | " | " |
| 3-SO₂CH₃—5-CN | " | " | " | " | " | " |
| 3-COOCH₃—5-Br | " | " | " | " | " | " |
| 3-COOCH₃—5-SCN | " | " | " | " | " | " |
| 3-CONHC₂H₄OH—5-COCH(CH₃)₂ | None | " | " | " | " | " |
| 3-CONHC₃H₆OCH₃—5-COCH(CH₃)₂ | " | " | " | " | " | " |
| 3-CN—5-SO₂CH₃ | " | " | " | " | " | " |
| 3,5-di-SO₂NH₂ | " | " | " | " | " | " |
| 3,5-di-SO₂NHC₂H₅ | 7-CH₃ | " | " | " | " | " |
| 3-COOCH₃—5-COC₆H₅ | " | " | " | " | " | " |
| 3-CONHC₄H₉—n-5-COC₆H₅ | " | " | " | " | " | " |
| 3-COOCH₃—5-SO₂CH₃ | " | " | " | " | " | " |
| 3-CONHC₂H₄OH—5-SO₂CH₃ | " | " | " | " | " | " |
| 3-CHO | " | " | " | " | " | " |
| 3-SO₂C₆H₅ | " | " | " | " | " | " |
| 3-CONHC₂H₅—5-COCH(CH₃)₂ | " | " | " | 2-Cl | " | " |
| " | " | " | " | 2-CH₃ | " | " |
| " | " | " | " | 3-CH₃ | " | " |
| " | " | " | " | 4-OCH₃ | " | " |
| " | " | " | " | 2,5-di-CH₃ | " | Na⁺ |
| " | " | " | " | 2,5-di-Cl | " | " |
| " | " | " | " | H | 2 | " |
| " | " | " | " | " | 3 | " |
| " | " | " | " | " | 4 | " |
| 3-COOCH₃—4CH₃—5-CONH₂ | " | " | " | " | 5 | " |
| " | 41 | " | " | " | 6 | " |

TABLE 21

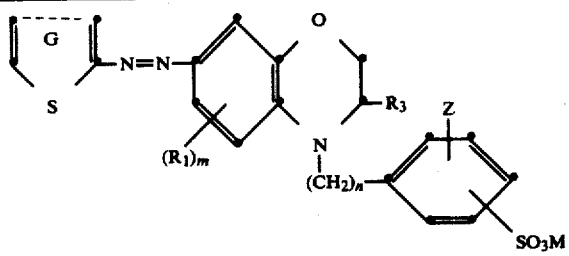

| Substituents on Ring G | $(R_1)_m$ | $R_3$ | Z | n | M |
|---|---|---|---|---|---|
| 3-COOCH$_3$—5-COCH(CH$_3$)$_2$ | None | H | H | 1 | Na$^+$ |
| 3-CONH$_2$—5-COCH(CH$_3$)$_2$ | 6-CH$_3$ | " | " | " | " |
| 3-CN—5-COCH(CH$_3$)$_2$ | " | 3-CH$_3$ | " | " | " |
| " | 6-OCH$_3$ | " | " | " | " |
| 3-CONH$_2$—5-C$_6$H$_5$ | " | H | " | " | " |
| " | 6-CH$_3$ | 3-CH$_3$ | " | " | " |
| " | " | " | " | " | " |
| 3-CN—5-C$_6$H$_5$ | " | " | " | " | " |
| 3-CONHC$_2$H$_4$OH—5-C$_6$H$_5$ | " | " | " | " | " |
| 3-CONHC$_2$H$_5$—5-COC$_6$H$_5$ | " | " | " | " | " |
| 3-CONHCH$_3$—5-COC$_6$H$_5$ | " | " | " | " | " |
| 3-CN—CH$_3$—5-COOC$_2$H$_5$ | " | " | " | " | " |
| 3-CN—CH$_3$—5-COOC$_2$H$_4$OCH$_3$ | " | " | " | " | " |
| 3-CHO—4,5-di-CH$_3$ | " | " | " | " | " |
| 3-CN—4-CH$_3$—5-SCH$_3$ | 6-NHCOCH$_3$ | " | " | " | K$^+$ |
| 3-COOCH$_3$—4-CH$_3$—5-CONH$_2$ | 6-NHCOC$_6$H$_5$ | " | " | " | " |
| 3-CONH$_2$—4-CH$_3$—5-CN | 6-NHCOC$_4$H$_9$-n | " | " | " | " |
| 3,5-di-CN—4-CH$_3$ | 6-NHCONHC$_2$H$_5$ | " | " | " | " |
| " | 6-NHCOCH$_2$OCH$_3$ | " | " | " | " |
| " | 6-NHCOCH$_2$CN | " | " | " | " |
| " | 6-CH$_3$ | " | " | " | Na$^+$ |
| 3-CONH$_2$—4-CH$_3$—5-COOCH$_3$ | " | " | " | " | " |
| 3-SO$_2$CH$_3$—5-COCH$_3$ | " | " | " | " | " |
| 3-SO$_2$C$_6$H$_5$—5-COCH$_3$ | " | " | " | " | " |
| 3-SO$_2$C$_6$H$_4$—p-Cl—5-COCH$_3$ | " | " | " | " | " |
| 3-SO$_2$CH$_3$—5-Br | " | " | " | " | " |
| 3,5-di-SO$_2$CH$_3$ | " | " | " | " | " |
| 3,5-di-SO$_2$NH$_2$ | " | " | " | " | " |
| 3,5-di-SO$_2$NHC$_2$H$_5$ | " | " | " | " | " |
| 3-CONHC$_2$H$_4$OH—5-COCH(CH$_3$)$_2$ | 6-NHCHO | " | " | " | " |
| 3-CONHC$_3$H$_6$OCH$_3$—5-COCH(CH$_3$)$_2$ | 6-CH$_3$ | " | " | " | " |
| 3-CONHC$_2$H$_4$NHCOCH$_3$ | " | " | " | " | " |
| 3-CONHC$_4$H$_9$-n-5-C$_6$H$_5$ | " | " | " | " | " |
| 3-CN—5-COOC$_2$H$_5$ | " | " | " | " | " |
| 3-CN—4-CH$_3$—5-COOCH(CH$_3$)$_2$ | " | " | " | " | " |
| 3-CN—4-CH$_3$—5-CONHC$_2$H$_5$ | " | " | " | " | " |
| 3-CN—4-CH$_3$—5-CONHC$_6$H$_5$ | " | " | " | " | " |
| 3-CONH$_2$—5-SO$_2$CH$_3$ | " | " | " | " | " |
| 3-CONH$_2$—5-COCH(CH$_3$)$_2$ | " | " | " | " | " |
| " | " | " | 2-CH$_3$ | " | " |
| " | " | " | 3-CH$_3$ | " | " |
| " | " | " | 4-CH$_3$ | " | " |
| " | " | " | 4-Cl | " | " |
| " | " | " | 4-OCH$_3$ | " | " |
| 3-CONHC$_2$H$_5$—5-COCH(CH$_3$)$_2$ | " | " | 4-Br | " | " |
| " | " | " | 2-CH$_3$ | " | " |
| " | " | " | 3-Cl | " | " |
| " | " | " | 4-OCH$_3$ | " | " |
| " | " | " | 2,5-di-CH$_3$ | " | " |
| " | " | " | 2,5-di-Cl | " | " |
| " | " | " | 4-Br | " | " |
| " | " | " | 4-I | " | " |
| " | " | " | H | 2 | " |
| " | " | " | " | 3 | " |
| " | " | " | " | 4 | " |
| " | " | " | " | 5 | " |
| " | " | " | " | 6 | " |

TABLE 22

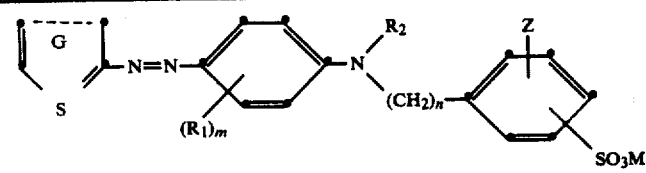

| Substituents on Ring H | $(R_1)_m$ | $R_2$ | Z | n | M |
|---|---|---|---|---|---|
| None | None | $C_2H_5$ | H | 1 | $Na^+$ |
| 4-$CH_3$ | " | " | " | " | " |
| 4-$CH_3$—5-CN | " | " | " | " | " |
| 5-CN | " | " | " | " | " |
| 5-CHO | 3-$CH_3$ | " | " | " | " |
| 4-$C_6H_5$—5-CHO | " | $CH_3$ | " | " | " |
| " | 2,5-di-$CH_3$ | H | " | " | " |
| 4-$C_6H_5$—5-CN | 3-Cl | " | " | " | " |
| 5-SCN | 3-$CH_3$ | $CH_2CH_2CH_2CH_3$ | " | " | " |
| 5-$COOCH_3$ | " | $CH_2CH_2OCH_3$ | " | " | " |
| " | " | $CH_2CH_2CN$ | " | " | " |
| " | " | $CH_2CH_2Cl$ | " | " | " |
| " | " | $CH_2CH_2CONH_2$ | " | " | " |
| " | " | $C_6H_5$ | " | " | " |
| " | " | $C_6H_{11}$ | " | " | " |
| " | " | $CH_2CH_2OH$ | " | " | " |
| " | " | $CH_2CH_2C_6H_5$ | " | " | " |
| " | " | $CH_2CH_2COOCH_3$ | " | " | " |
| 5-$CONH_2$ | None | $C_2H_5$ | " | " | " |
| 5-$CONHC_2H_5$ | " | " | " | " | " |
| 5-$CON(C_2H_5)_2$ | " | " | " | " | " |
| 5-$CONHC_2H_4OH$ | " | " | " | " | $H^{30}$ |
| 5-$CO_2C_2H_5$ | " | " | " | " | " |
| 5-$CO_2C_4H_9$—n | " | " | " | " | " |
| 5-$SCH_3$ | " | " | " | " | " |
| 5-$SC_2H_4OH$ | " | " | " | " | " |
| 5-$SO_2CH_3$ | " | " | " | " | $NH_4^+$ |
| 5-$SO_2CH_2CH_2OH$ | " | " | " | " | " |
| 5-$SO_2NH_2$ | " | " | " | " | " |
| 5-$SO_2NHC_2H_4OH$ | " | " | " | " | " |
| 5-$SO_2N(C_2H_5)_2$ | " | " | " | " | " |
| 5-$SO_2NHC_6H_{11}$ | " | " | " | " | " |
| 5-$SO_2C_6H_5$ | " | " | " | " | " |
| 4-$CH_2Cl$ | " | " | " | " | " |
| 4-$CF_3$ | " | " | " | " | " |
| 4-$CH_3$—5-$COCH_3$ | " | " | " | " | $Na^+$ |
| 5-$COC_6H_5$ | " | " | " | " | " |
| 5-$COCH_3$ | " | " | " | " | " |
| 5-N=N—$C_6H_5$ | " | " | " | " | " |
| 5-Br | " | " | " | " | $K^+$ |
| 4-$CH_3$—5-$COOC_2H_5$ | 3-$CH_3$ | $CH_3$ | " | " | " |
| " | None | $C_4H_9$—n | 2-$CH_3$ | " | " |
| " | " | $C_2H_5$ | 3-$CH_3$ | " | " |
| " | " | " | 4-Cl | " | " |
| " | " | " | 2,5-di-Cl | " | " |
| " | " | " | 2,5-di-$CH_3$ | " | " |
| " | " | " | 4-$OCH_3$ | " | " |
| " | " | " | 4-Br | " | " |
| " | " | " | 4-I | " | " |
| 4-$CH_3$—5-$COOCH_3$ | " | " | 4-$CH_3$ | 2 | " |
| " | " | " | 2-Cl | 3 | " |
| " | " | " | 3-Cl | 4 | " |
| " | " | " | H | 2 | " |
| " | " | " | " | 3 | " |
| " | " | " | " | 4 | " |
| " | " | " | " | 5 | " |
| " | " | " | " | 6 | " |

TABLE 23

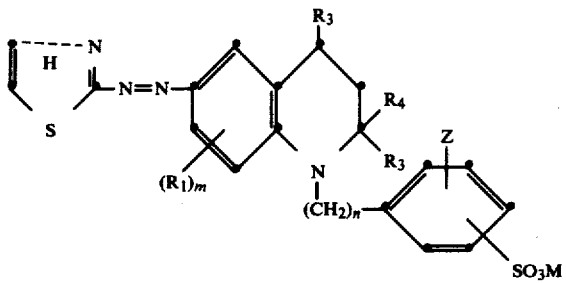

| Substituents on Ring H | $(R_1)_m$ | $R_3$ | $R_4$ | Z | n | M |
|---|---|---|---|---|---|---|
| None | None | H | $CH_3$ | H | 1 | $Na^+$ |
| 4-$CH_3$ | 7-$CH_3$ | " | " | " | " | " |
| 4-$C_6H_5$ | " | " | " | " | " | " |
| 4-$CF_3$ | " | " | " | " | " | " |
| 5-$CONH_2$ | " | " | " | " | " | " |
| 5-$CON(C_2H_5)_2$ | " | " | " | " | " | " |
| 5-CN | " | " | " | " | " | " |
| 5-SCN | " | " | " | " | " | " |
| 5-$CO_2CH_3$ | " | " | " | " | " | " |
| 5-$CO_2C_2H_4OCH_3$ | " | " | " | " | " | " |
| 5-CHO | " | " | " | " | " | " |
| 4-$C_6H_5$—5-CHO | " | " | " | " | " | " |
| 5-$SC_4H_9$—n | " | " | " | " | " | " |
| 5-$SO_2C_4H_9$—n | " | " | " | " | " | " |
| 5-$SO_2NH_2$ | " | " | " | " | " | " |
| 5-$SO_2NHC_2H_4OH$ | " | " | " | " | " | " |
| 5-$SO_2N(C_2H_5)_2$ | " | " | " | " | " | " |
| 5-$SO_2NHC_6H_5$ | " | " | " | " | " | " |
| 5-N=N—$C_6H_5$ | " | " | " | " | " | " |
| 5-$COOH_3$ | " | " | " | " | " | " |
| 5-$COC_6H_5$ | " | " | " | " | " | " |
| 5-$SO_2C_6H_5$ | " | " | " | " | " | " |
| 5-$CO_2CH_3$ | None | $CH_3$ | " | " | " | " |
| " | " | H | H | " | " | " |
| " | 7-$CH_3$ | $CH_3$ | $CH_3$ | " | " | " |
| " | 7-$NHCOCH_3$ | H | $CH_3$ | " | " | " |
| " | 7-$OCH_3$ | " | " | " | " | $K^+$ |
| " | 7-Cl | " | " | " | " | " |
| " | 5-$CH_3$—8-$OCH_3$ | " | " | " | " | " |
| " | 5-$CH_3$—8-$OC_2H_5$ | " | " | " | " | " |
| " | 5,8-di-$CH_3$ | " | " | " | " | " |
| " | 8-$OCH_3$ | " | " | " | " | " |
| " | 5,8-di-$OCH_3$ | " | " | " | " | " |
| " | 7-NHCHO | " | " | " | " | " |
| " | 7-$NHCO_2C_2H_5$ | " | " | " | " | " |
| " | 7-$NHCOC_6H_{11}$ | " | " | " | " | " |
| " | 7-$CH_3$ | " | " | " | " | $H^+$ |
| " | " | " | " | " | " | $NH_4^+$ |
| 4-$CH_3$—5-$CO_2CH_3$ | " | " | " | " | " | $K^+$ |
| " | " | " | " | 4-$OCH_3$ | " | " |
| " | " | " | " | 4-Br | " | " |
| " | " | " | " | 2-Cl | " | " |
| " | " | " | " | 4-$CH_3$ | " | " |
| " | " | " | " | 3-Cl | " | " |
| " | " | " | " | 2,5-di-Cl | " | " |
| " | " | " | " | 2,5-di-$CH_3$ | " | " |
| 4-$CH_3$—5-$CO_2C_2H_5$ | 7-$NHCOCH_3$ | $CH_3$ | $CH_3$ | H | " | " |
| " | 7-$OCH_3$ | H | $CH_3$ | " | " | " |
| " | H | H | H | " | " | " |
| " | 7-$CH_3$ | $CH_3$ | $CH_3$ | " | " | " |
| " | " | H | $CH_3$ | " | 2 | " |
| " | " | " | " | " | 3 | " |
| " | " | " | " | " | 4 | " |
| " | " | " | " | " | 5 | " |
| " | " | " | " | " | 6 | " |

TABLE 24

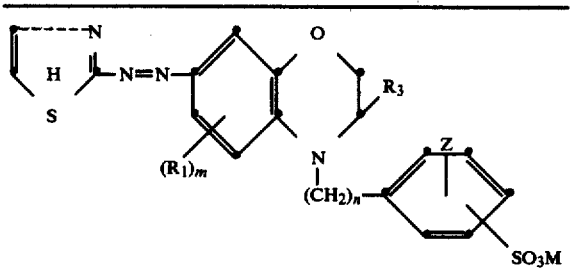

| Substituents on Ring H | (R₁)ₘ | R₃ | Z | n | M |
|---|---|---|---|---|---|
| None | H | H | H | 1 | Na⁺ |
| 4-CH₃ | 7-CH₃ | " | " | " | " |
| 4-C₆H₅ | " | CH₃ | " | " | " |
| 4-CH₃—CN | " | " | " | " | " |
| 4-C₆H₅—CHO | " | " | " | " | " |
| 4-CH₃—SCN | " | " | " | " | " |
| 4-CH₃—COCH₃ | " | " | " | " | " |
| 5-COC₆H₅ | " | " | " | " | " |
| 5-CHO | " | " | " | " | " |
| 5-CN | " | " | " | " | " |
| 5-COCH₃ | " | " | " " | " | |
| 5-SCN | " | " | " | " | " |
| 5-N=NC₆H₅ | " | " | " | " | " |
| 5-CONH₂ | " | " | " | " | " |
| 5-CONHC₂H₄OH | " | " | " | "" | |
| 5-CON(C₂H₅)₂ | " | " | " | " | " |
| 5-SC₄H₉—n | " | " | " | " | " |
| 5-SO₂C₄H₉—n | " | " | " | " | " |
| 5-Br | " | " | " | " | " |
| 5-SO₂C₆H₅ | " | " | " | " | " |
| 5-SO₂NH₂ | " | " | " | " | " |
| 5-SO₂NHC₂H₅ | " | " | " | " | " |
| 5-SO₂N(C₂H₅)₂ | " | " | " | " | " |
| 5-SO₂NH₃C₆H₃OCH₃ | " | " | " | " | " |
| 5-CO₂C₄H₉—n | " | " | " | " | " |
| 5-CO₂C₂H₄OCH₃ | " | " | " | " | " |
| 5-CO₂C₂H₅ | " | " | " | " | " |
| 4-CF₃ | " | " | " | " | " |
| 4-CH₂Cl | " | " | " | " | " |
| 4-CF₃—5-Br | " | " | " | " | " |
| 5-SO₃C₆H₅ | " | " | " | " | " |
| 5-CO₂C₆H₅ | " | " | " | " | " |
| 4-CH₃-5-CO₂CH₃ | 7-CH₃ | H | " | " | NH₄⁺ |
| " | " | H | " | " | H⁺ |
| " | " | H | " | " | K⁺ |
| " | None | CH₃ | " | " | " |
| " | 7-OCH₃ | " | " | " | " |
| " | 7-Cl | " | " | " | " |
| " | 7-NHCOCH₃ | " | " | " | " |
| " | 7-NHCHO | " | " | " | " |
| " | 7-NHSO₂CH₃ | " | " | " | " |
| " | 7-NHCO₂CH₃ | " | " | " | " |
| " | 7-NHCONHC₂H₅ | " | " | " | " |
| 4-CH₃-5-CO₂C₂H₅ | 7-CH₃ | " | 4-CH₃ | " | " |
| " | " | " | 3-CH₃ | " | " |
| " | " | " | 2-CH₃ | " | " |
| " | " | " | 2-Cl | " | " |
| " | " | " | 3-Cl | " | " |
| " | " | " | 2,5-di-Cl | " | " |
| " | " | " | 2,5-di-CH₃ | " | " |
| " | " | " | 2-OCH₃ | " | " |
| " | " | " | 4-OCH₃ | " | " |
| " | " | " | H | 2 | " |
| " | " | " | " | 3 | " |
| " | " | " | " | 4 | " |
| " | " | " | " | 5 | " |
| " | " | " | " | 6 | " |

The invention has been described in detail with particular reference to preferred embodiments thereof, but it will be understood that variations and modifications can be effected within the spirit and scope of the invention.

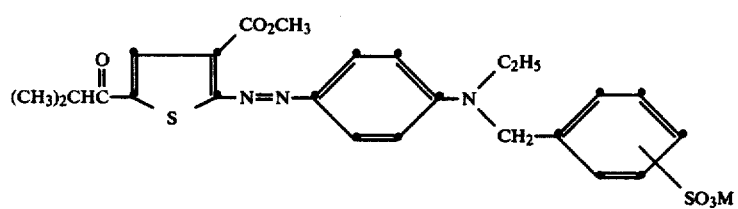

We claim:

1. A compound of the formula:

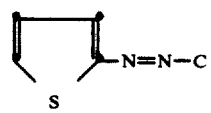

wherein the thiophen-2-yl radical is unsubstituted or substituted with 1-3 groups selected from alkyl, cyano, alkoxycarbonyl, alkanoyl, alkylsulfonyl, arylsulfonyl, carbamoyl, alkylcarbamoyl, aryl, halogen, sulfamoyl, alkylsulfamoyl, and formyl; the coupler C is selected from

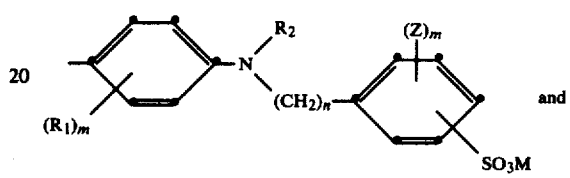

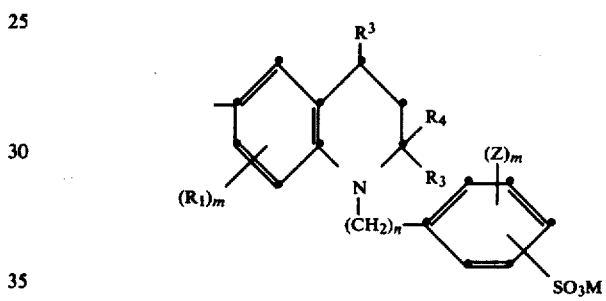

wherein each $R_1$ and $Z$ is selected independently from alkyl, alkoxy, alkenyl of 2-6 carbons, halogen, alkanoylamino, and alkylthio; $R_2$ is selected from hydrogen, alkyl, alkenyl of 2-6 carbons, aryl, cycloalkyl, and $$-(CH_2)_n-\begin{array}{c}SO_3M\\ \\(Z)_m\end{array};$$

$R_3$ and $R_4$ are each selected from hydrogen and alkyl; M is H⁺, Na⁺, K⁺, or NH₄⁺; n is 1-6; and m is 0, 1 or 2; and wherein all of the above defined alkyl, alkoxy, alkylene, alkenyl and cyclic moieties in the definitions of $R_1$, $R_2$ and Z are unsubstituted or substituted with 1-3 substituents selected from hydroxy, alkoxy, aryl, aryloxy, cyclohexyl, furyl, alkylcyclohexyl, aroyloxy, alkoxycarbonyl, alkanoyloxy, sulfamoyl, SO₂NH(aryl), SO₂NH(alkyl), SO₂N(dialkyl), NHCOO(alkyl), NHCONH(alkyl), alkanoylamino, alkylsulfonamido, succinimido, glutarimido, phthalimido, 2-pyrrolidono, cyano, carbamoyl, alkylcarbamoyl, alkoxyalkoxy, alkylthio, halogen, arylthio, alkylsulfonyl and arylsulfonyl.

2. A compound according to claim 1 wherein the thiophen-2-yl is as defined therein, and the coupler has the formula

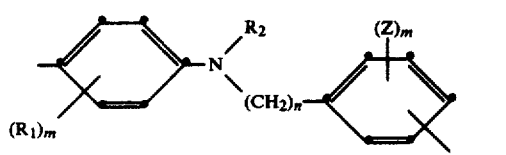

as defined therein.

3. A compound according to claim 1 wherein the thiophen-2-yl is as defined therein, and the coupler has the formula

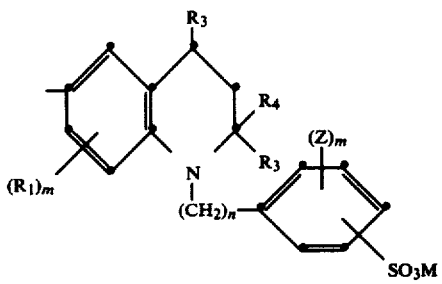

as defined therein.

4. A compound according to claim 1 wherein the thiophen-2-yl radical is substituted with 1–3 groups selected from alkyl, cyano, alkoxycarbonyl, alkanoyl, carbamoyl, alkylcarbamoyl, aryl, and formyl.

5. The compound according to claim 1 having the formula

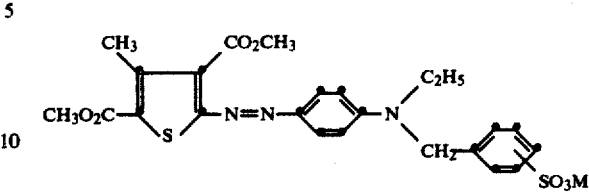

6. The compound according to claim 1 having the formula

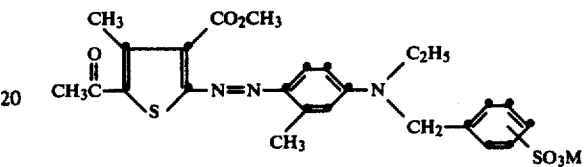

7. The compound according to claim 1 having the formula

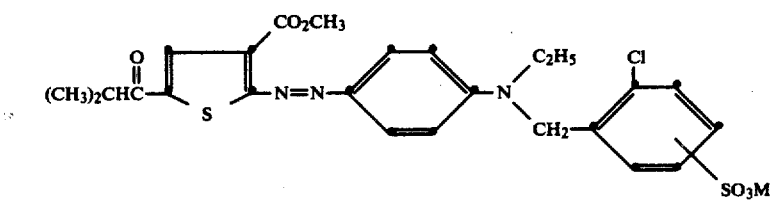

8. The compound according to claim 1 having the formula

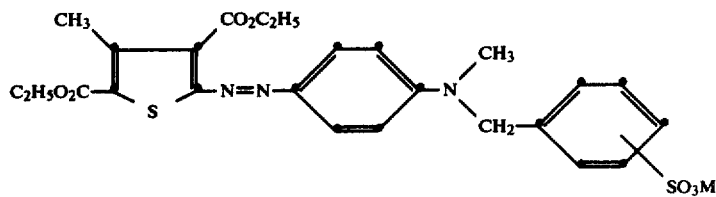

9. The compound according to claim 1 having the formula

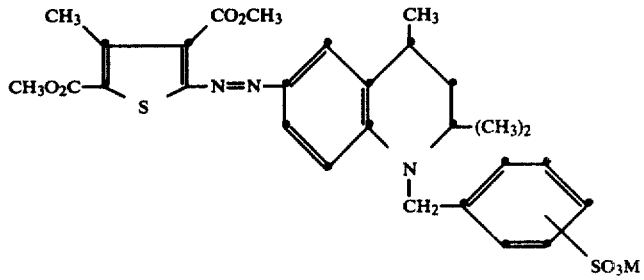

10. The compound according to claim 1 having the formula